US012693588B2

(12) United States Patent
Akiyama

(10) Patent No.: US 12,693,588 B2
(45) Date of Patent: Jul. 28, 2026

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/279,360

(22) Filed: Jul. 24, 2025

(65) Prior Publication Data

US 2026/0029700 A1     Jan. 29, 2026

(30) Foreign Application Priority Data

Jul. 26, 2024     (JP) ................................. 2024-120944

(51) Int. Cl.
G03B 21/20          (2006.01)
(52) U.S. Cl.
CPC ....... G03B 21/204 (2013.01); G03B 21/2013 (2013.01); G03B 21/208 (2013.01)
(58) Field of Classification Search
CPC .................................................. G03B 21/204
See application file for complete search history.

(56) References Cited

U.S. PATENT DOCUMENTS

2016/0293803 A1* 10/2016 Kim ...................... H10H 20/862
2019/0346753 A1* 11/2019 Pan ....................... H04N 9/3102
2020/0026172 A1*  1/2020 Sakata ............... G02B 27/0994
2020/0192114 A1*  6/2020 Chen .................. G03B 21/2066

FOREIGN PATENT DOCUMENTS

CN        113311655 A  *  8/2021  ........... G03B 21/204
JP        2017-009981 A     1/2017

OTHER PUBLICATIONS

English Machine Translation for CN 113311655 A (Year: 2021).*

* cited by examiner

*Primary Examiner* — Keith G. Delahoussaye
(74) *Attorney, Agent, or Firm* — Dority & Manning, P.A.

(57)          ABSTRACT

A light source apparatus according to an aspect of the present disclosure includes a first light source configured to output first light; a second light source configured to output second light; a wavelength converter configured to convert the first light and second light into third light; a first optical layer configured to transmit the first light and reflect the third light; a light guide configured to guide light; an incident angle adjusting system configured to adjust an angle of incidence of the second light with respect to the wavelength converter; and a second optical layer configured to transmit the second light and reflect the third light. The wavelength converter has a first surface, a second surface, and a third surface. The first light enters the wavelength converter via the first optical layer and the light guide and via the third surface. The third light exits out of a region on the first surface side of the light guide. The second light enters the incident angle adjusting system, which adjusts the angle of incidence of the second light, and the resultant second light enters a region on the second surface side of the light guide via the second optical layer, and part of the second light enters the wavelength converter via the third surface and is converted into the third light by the wavelength converter, and another part of the second light exits out of a region on the first surface of the light guide.

18 Claims, 10 Drawing Sheets

LIGHT SOURCE APPARATUS AND PROJECTOR

The present application is based on, and claims priority from JP Application Serial Number 2024-120944, filed Jul. 26, 2024, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light emitted from a light emitter. JP-A-2017-009981 described below discloses a light source apparatus including a first light source that outputs excitation light, a phosphor rod that converts the excitation light in terms of wavelength into yellow light, a second light source that outputs blue light, and a transparent rod that transmits the yellow light and the blue light. JP-A-2017-009981 describes that the light source apparatus allows white light that is the combination of the yellow light and the blue light to be extracted from the transparent rod by turning on the first light source and the second light source.

JP-A-2017-009981 is an example of the related art.

The light source apparatus disclosed in JP-A-2017-009981 has a configuration in which blue light emitting diodes that constitute the second light source are disposed so as to face a side surface of a transparent rod, and the blue light enters the transparent rod via the side surface thereof and exits via an end surface thereof. In the configuration described above, however, the blue light has many angular components, and there are many angular components incident on side surfaces of the transparent rod at angles of incidence smaller than the critical angle before reaching the end surface of the transparent rod. A large amount of the blue light therefore leaks out of the transparent rod via the side surfaces thereof, so that it is difficult to adjust the ratio between the amount of the yellow light and the amount of the blue light. Therefore, the light source apparatus has a problem, that is, desired white light cannot be produced.

SUMMARY

A light source apparatus according to an aspect of the present disclosure includes: a first light source configured to output first light having a first wavelength band; a second light source configured to output second light having a second wavelength band; a wavelength converter configured to convert the first light and the second light into third light having a third wavelength band different from the first wavelength band and the second wavelength band; a first optical layer disposed between the first light source and the wavelength converter and configured to transmit the first light and reflect the third light; a light guide disposed between the first optical layer and the wavelength converter and configured to guide each of the first light, the second light, and the third light; an incident angle adjusting system disposed between the second light source and the light guide and configured to adjust an angle of incidence of the second light with respect to the wavelength converter; and a second optical layer disposed between the incident angle adjusting system and the light guide and configured to transmit the second light and reflect the third light. The wavelength converter has a first surface and a second surface that face opposite sides, and a third surface that intersects with the first surface and the second surface. The first light output from the first light source enters the wavelength converter via the first optical layer and the light guide and via the third surface. The third light, into which the first light and the second light are converted by the wavelength converter, travels through the light guide, and exits out of a region on the first surface side of the light guide. The second light output from the second light source enters the incident angle adjusting system, which adjusts the angle of incidence of the second light, and the resultant second light enters a region on the second surface side of the light guide via the second optical layer. Part of the second light entering the light guide enters the wavelength converter via the third surface and is converted into the third light by the wavelength converter, and another part of the second light entering the light guide exits out of a region on the first surface side of the light guide.

A projector according to another aspect of the present disclosure includes: the light source apparatus according to the aspect of the present disclosure; a light modulator configured to modulate light output from the light source apparatus; and a projection optical apparatus configured to project the light modulated by the light modulator.

BRIEF DESCRIPTION OF THE DRAWINGS

FIG. 4 is a cross-sectional view of a light source apparatus according to a second embodiment.

FIG. 7 is a cross-sectional view of a light source apparatus according to a fourth embodiment.

FIG. 9 is a cross-sectional view of a light source apparatus according to a sixth embodiment.

FIG. 10 is a cross-sectional view of a light source apparatus according to a seventh embodiment.

DESCRIPTION OF EMBODIMENTS

First Embodiment

A first embodiment of the present disclosure will be described below with reference to the drawings.

A projector according to the present embodiment is an example of a projector using liquid crystal panels as light modulators.

In the following drawings, elements may be drawn at different dimensional scales for clarity of the elements.

Figure 1:
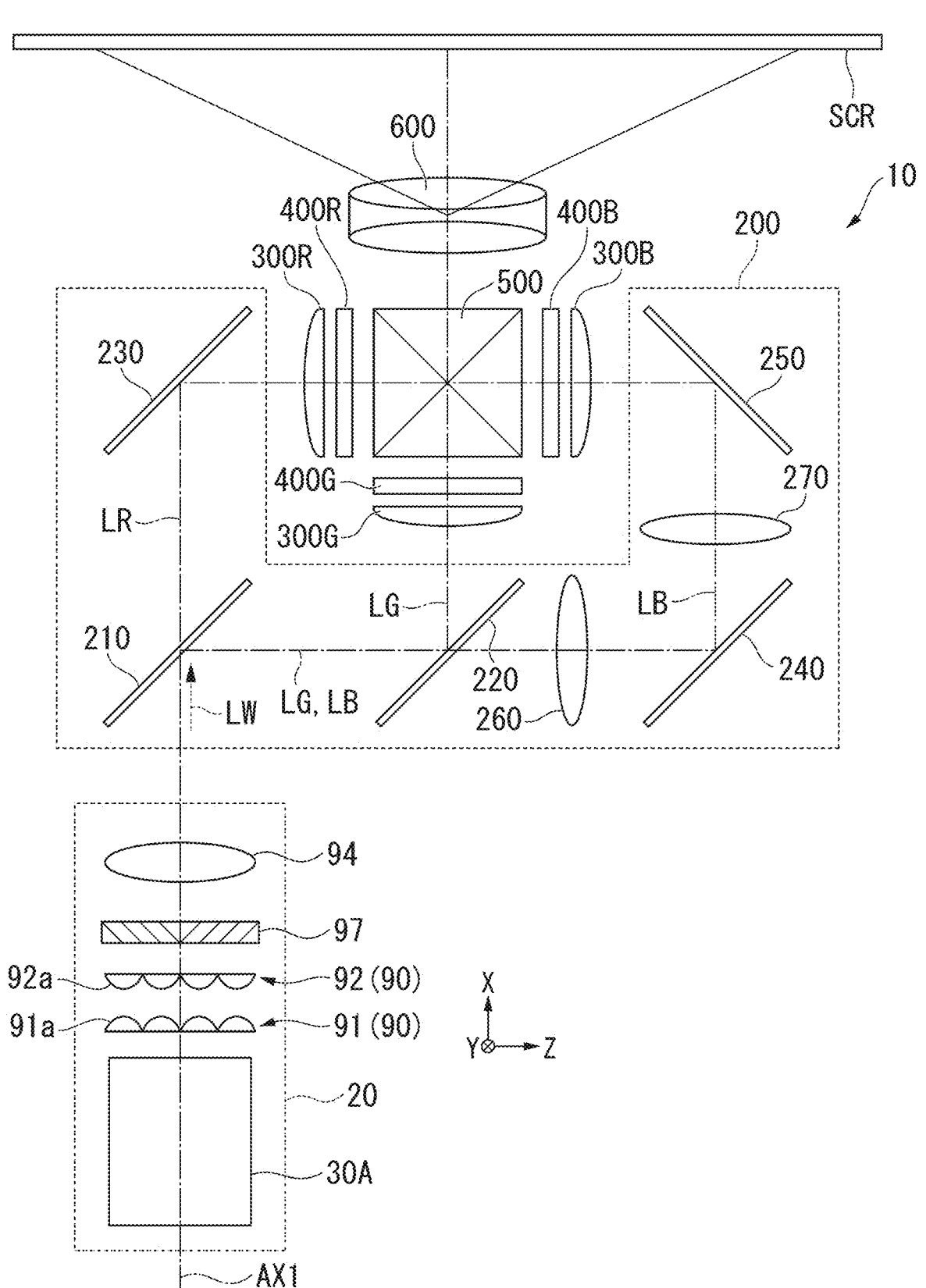
FIG. 1 is a schematic configuration diagram of a projector according to a first embodiment.

FIG. 1 is a schematic configuration diagram of a projector 10 according to the present embodiment.

The projector 10 according to the present embodiment is a projection-type image display apparatus that displays a color image on a screen SCR, which is a projection receiving surface, as shown in FIG. 1. The projector 10 includes three light modulators corresponding to three types of color light, red light LR, green light LG, and blue light LB.

The projector 10 includes an illuminator 20, a color separation/light guide system 200, a red light modulator 400R, a green light modulator 400G, a blue light modulator 400B, a light combiner 500, and a projection optical apparatus 600.

The illuminator 20 includes a light source apparatus 30A, an optical integration system 90, a polarization converter 97, and a superimposing system 94. The Illuminator 20 outputs white light LW containing the red light LR, the green light LG, and the blue light LB. A specific configuration of the Illuminator 20 will be described later.

The following description with reference to the drawings will be made by using an XYZ orthogonal coordinate system in as required. The X-axis is an axis parallel to an optical axis AX1 of the Illuminator 20 and extends along the frontward-rearward direction of the projector 10. The Y-axis is an axis orthogonal to the X-axis and extends along the upward-downward direction of the projector 10. The Z-axis is an axis orthogonal to the X-axis and the Y-axis, and extends along the rightward-leftward direction of the projector 10. The notations described above are intended for describing the positional relationship among the constituent members of the projector 10, and do not limit the posture and the orientation of the installed projector 10. The optical axis AX1 of the illuminator 20 is the center axis of the white light LW output from the illuminator 20.

In the following description, one of the two directions along the X-axis is referred to as a +X direction, and the direction opposite the +X direction is referred to as a −X direction. One of the two directions along the Y-axis is referred to as a +Y direction, and the direction opposite the +Y direction is referred to as a −Y direction. One of the two directions along the Z-axis is referred to as a +Z direction, and the direction opposite the +Z direction is referred to as a −Z direction. When the two directions along the X-axis are not distinguished from each other, they are collectively referred to as an X-axis direction. When the two directions along the Y-axis are not distinguished from each other, they are collectively referred to as a Y-axis direction. When the two directions along the Z-axis are not distinguished from each other, they are collectively referred to as a Z-axis direction.

The color separation/light guide system 200 includes a first dichroic mirror 210, a second dichroic mirror 220, a first reflection mirror 230, a second reflection mirror 240, a third reflection mirror 250, a first relay lens 260, and a second relay lens 270. The color separation/light guide system 200 separates the white light LW output from the illuminator 20 into the red light LR, the green light LG, and the blue light LB, guides the red light LR to the red light modulator 400R, guides the green light LG to the green light modulator 400G, and guides the blue light LB to the blue light modulator 400B.

A field lens 300R is disposed between the color separation/light guide system 200 and the red light modulator 400R. A field lens 300G is disposed between the color separation/light guide system 200 and the green light modulator 400G. A field lens 300B is disposed between the color separation/light guide system 200 and the blue light modulator 400B. The field lens 300R parallelizes the chief ray of the red light LR to be incident on the red light modulator 400R. The field lens 300G parallelizes the chief ray of the green light LG to be incident on the green light modulator 400G. The field lens 300B parallelizes the chief ray of the blue light LB to be incident on the blue light modulator 400B.

The first dichroic mirror 210 transmits the red light LR and reflects the green light LG and the blue light LB. The second dichroic mirror 220 reflects the green light LG and transmits the blue light LB. The first reflection mirror 230 reflects the red light LR. The second reflection mirror 240 and the third reflection mirror 250 each reflect the blue light LB.

The red light modulator 400R, the green light modulator 400G, the blue light modulator 400B each modulate the color light incident on the light modulator in accordance with image information to produce image light. The red light modulator 400R, the green light modulator 400G, the blue light modulator 400B are each configured with a liquid crystal panel.

Although not shown, light-incident-side polarizers are disposed between the field lens 300R and the red light modulator 400R, between the field lens 300G and the green light modulator 400G, and between the field lens 300B and the blue light modulator 400B. Furthermore, light-exiting-side polarizers are disposed between the red light modulator 400R and the light combiner 500, between the green light modulator 400G and the light combiner 500, and between the blue light modulator 400B and the light combiner 500. The light-incident-side polarizers and the light-exiting-side polarizers transmit only linearly polarized light polarized in a specific direction.

When the image light output from the red light modulator 400R, the image light output from the green light modulator 400G, and the image light output from the blue light modulator 400B enter the light combiner 500, the light combiner 500 combines the image light corresponding to the red light LR, the image light corresponding to the green light LG, and the image light corresponding to the blue light LB with one another and outputs the combined image light toward the projection optical apparatus 600. The light combiner 500 is, for example, a cross dichroic prism.

The projection optical apparatus 600 is configured with multiple projection lenses. The projection optical apparatus 600 enlarges the combined image light from the light combiner 500 and projects the enlarged image light toward the screen SCR. An image is thus displayed on the screen SCR.

The configurations of the light source apparatus 30A and the illuminator 20 will be described below.

Figure 2:
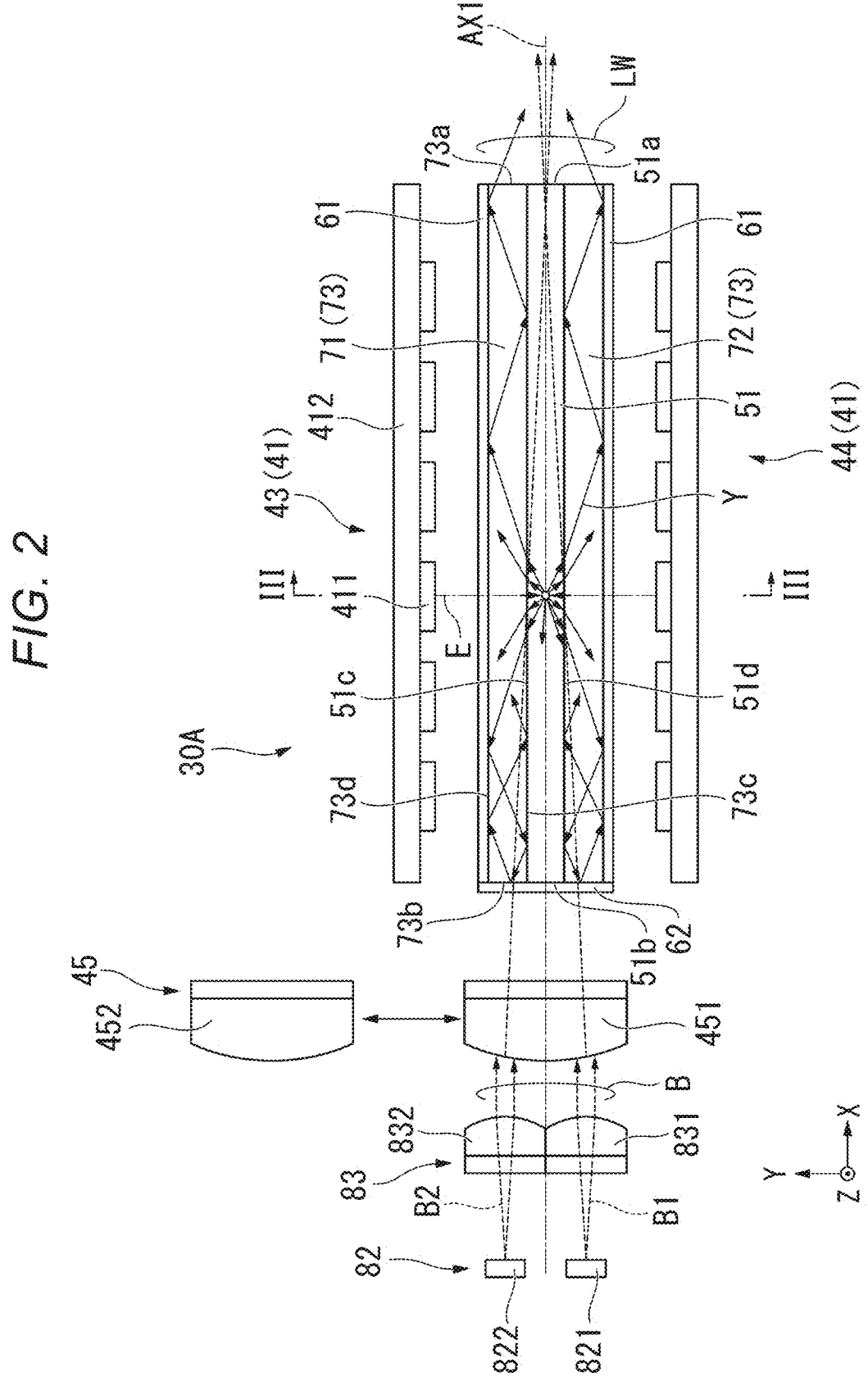
FIG. 2 is a cross-sectional view of a light source apparatus according to the first embodiment.
Figure 3:
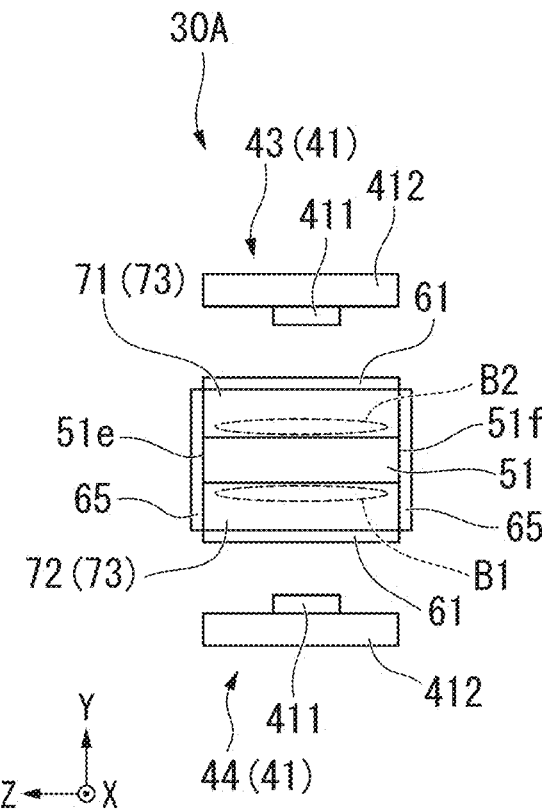
FIG. 3 is a cross-sectional view of the light source apparatus taken along the line III-III in FIG. 2.

FIG. 2 is a cross-sectional view of the light source apparatus 30A according to the present embodiment. FIG. 3 is a cross-sectional view of the light source apparatus 30A taken along the line III-III in FIG. 2.

The light source apparatus 30A according to the present embodiment includes a first light source 41, a wavelength converter 51, a first light guide 71, a second light guide 72, first optical layers 61, a second light source 82, a parallelizing system 83, an incident angle adjusting system 45, a second optical layer 62, and reflection layers 65, as shown in FIGS. 2 and 3.

The first light source 41 includes a third light source 43 and a fourth light source 44. The third light source 43 and the fourth light source 44 have the same configuration. The third light source 43 and the fourth light source 44 each include multiple light emitters 411. The multiple light emitters 411 are mounted on substrates 412. Note that the number of the light emitters 411 provided in the first light source 41 is not limited to a specific number.

The light emitters 411 each emit an excitation beam having a first wavelength band. The light emitters 411 are each configured with a light emitting diode (LED). Configuring each of the light emitters 411 with an LED allows reduction in cost and improvement in light emission efficiency of the light source apparatus 30A. The light emitters 411 are disposed so as to face the wavelength converter 51, and each emit the excitation beam toward the wavelength converter 51. The first wavelength band is, for example, a wavelength band ranging from 400 nm to 480 nm corresponding to colors ranging from violet to blue. The center wavelength of the first wavelength band is, for example, 455 nm. The multiple light emitters 411 are arranged along the X-axis direction, which is the longitudinal direction of the wavelength converter 51.

The third light source 43 outputs multiple excitation beams toward the wavelength converter 51 via the first light guide 71. The fourth light source 44 is disposed so as to face the third light source 43 with the wavelength converter 51 interposed therebetween. The fourth light source 44 outputs multiple blue excitation beams toward the wavelength converter 51 via the second light guide 72. The first light source 41 thus causes excitation light E having the first wavelength band and containing the multiple blue excitation beams to enter the wavelength converter 51. The excitation light E in the present embodiment corresponds to the first light in the claims.

The wavelength converter 51 has a plate-like shape extending along the X-axis and has six surfaces. The sides of the wavelength converter 51 that extend along the X-axis are longer than the sides thereof that extend along the Y-axis and the Z-axis. The X-axis direction corresponds to the longitudinal direction of the wavelength converter 51. The Y-axis direction is a direction parallel to the shortest side of the sides of the wavelength converter 51. The sides along the Y-axis are shorter than the sides along the Z-axis. That is, the wavelength converter 51 has a rectangular cross-sectional shape taken along a plane along the YZ plane, as shown in FIG. 3.

The wavelength converter 51 has a first end surface 51a, a second end surface 51b, a first side surface 51c, a second side surface 51d, a third side surface 51e, and a fourth side surface 51f. The first end surface 51a and the second end surface 51b face opposite sides in the X-axis direction along the longitudinal direction of the wavelength converter 51. In the present embodiment, the first end surface 51a is located on the +X side, which is one side in the X-axis direction. The second end surface 51b is located on the −X side, which is the other side in the X-axis direction. The first end surface 51a in the present embodiment corresponds to the first surface in the claims. The second end surface 51b in the present embodiment corresponds to the second surface in the claims.

The first side surface 51c and the second side surface 51d intersect with the first end surface 51a and the second end surface 51b and face opposite sides in the Y-axis. In the present embodiment, the first side surface 51c is located on the +Y side, which is one side in the Y-axis direction. The second side surface 51d is located on the −Y side, which is the other side in the Y-axis direction. The excitation light E is incident on the first side surface 51c from the third light source 43 via the first light guide 71. The excitation light E is incident on the second side surface 51d from the fourth light source 44 via the second light guide 72. The first side surface 51c and the second side surface 51d in the present embodiment correspond to the third surface in the claims.

The third side surface 51e and the fourth side surface 51f intersect with the first end surface 51a and the second end surface 51b, intersect with the first side surface 51c and the second side surface 51d, and face opposite sides in the Z-axis direction, as shown in FIG. 3. The third side surface 51e is located on the +Z side, which is one side in the Z-axis direction. The fourth side surface 51f is located on the −Z side, which is the other side in the Z-axis direction.

The wavelength converter 51 contains at least a yellow phosphor, and converts the excitation light E having the first wavelength band and output from the first light source 41 into yellow fluorescence Y having a third wavelength band different from the first wavelength band and a second wavelength band that will be described later. As will be described later in detail, part of the yellow fluorescence Y generated in the wavelength converter 51 exits via the first side surface 51c into the first light guide 71, and another part of the yellow fluorescence Y exits via the second side surface 51d into the second light guide 72.

The wavelength converter 51 contains a ceramic phosphor configured with a polycrystalline phosphor that converts the excitation light E in terms of wavelength into the yellow fluorescence Y. The wavelength converter 51 is configured with a phosphor that scatters light, that is, what is called a scattering phosphor. The third wavelength band of the yellow fluorescence Y is a yellow wavelength band ranging, for example, from 490 to 750 nm. The center wavelength of the third wavelength band is, for example, 550 nm. That is, the fluorescence Y is yellow fluorescence containing a red light component and a green light component. The yellow fluorescence Y in the present embodiment corresponds to the third light in the claims.

The wavelength converter 51 may contain monocrystal phosphor in place of the polycrystalline phosphor. The wavelength converter 51 may instead be made of fluorescent glass. The wavelength converter 51 may still instead be made of a material in which a large number of phosphor particles are dispersed in a binder made of glass or resin. The wavelength converter 51 made of any of the materials described above converts the blue excitation light E into the yellow fluorescence Y.

Specifically, the material of the wavelength converter 51 contains, for example, an yttrium-aluminum-garnet-based (YAG-based) phosphor. Consider YAG:Ce, which contains cerium (Ce) as an activator, by way of example, and the wavelength converter 51 is made, for example, of a material produced by mixing raw powder materials containing $Y_2O_3$, $Al_2O_3$, $CeO_3$, and other constituent elements with one another and causing the mixture to go through a solid-phase reaction; Y—Al—O amorphous particles produced by using a coprecipitation method, a sol-gel method, or any other wet method; or YAG particles produced by using a spray-drying method, a flame-based thermal decomposition method, thermal plasma method, or any other gas-phase method.

The first optical layers 61 are disposed between the first light source 41 and the wavelength converter 51. That is, the first optical layers 61 are disposed between the third light source 43 and the wavelength converter 51, and between the fourth light source 44 and the wavelength converter 51. The first optical layers 61 have an optical characteristic of transmitting the excitation light E and reflecting the yellow fluorescence Y. The first optical layers 61 are each configured, for example, with a dielectric multilayer film. The first optical layers 61 are disposed on a second side surface 73d of a light transmissive member 73, which will be described later, the second side surface 73d being the surface facing the first light source 41.

The first light guide 71 and the second light guide 72 are disposed between the first optical layers 61 and the wavelength converter 51. That is, the first light guide 71 is disposed between the first optical layer 61 that faces the third light source 43 and the first side surface 51c of the wavelength converter 51. The second light guide 72 is disposed between the first optical layer 61 that faces the fourth light source 44 and the second side surface 51d of the wavelength converter 51. The first light guide 71 and the second light guide 72 have the same configuration.

The first light guide 71 and the second light guide 72 each guide the excitation light E output from the first light source 41, the yellow fluorescence Y, into which the excitation light E is converted by the wavelength converter 51, and the blue light B output from the second light source 82. In the present embodiment, the first light guide 71 and the second light guide 72 are each configured with the light transmissive member 73, which transmits the excitation light E, the yellow fluorescence Y, and the blue light B. The light transmissive member 73 is a plate-shaped member and is bonded to each of the first side surface 51c and the second side surface 51d of the wavelength converter 51 with an optical adhesive (not shown). The first light guide 71 and the second light guide 72 in the present embodiment correspond to the light guide in the claims.

The light transmissive member 73 is made of a light transmissive material, for example, borosilicate glass such as BK7, quartz, synthetic quartz, quartz crystal, SiC, GaN, MgO, YAG, sapphire, and diamond. The light transmissive member 73 needs to be made of a material capable of transmitting the excitation light E, the yellow fluorescence Y, and the blue light B, as described above. The light transmissive member 73 has a plate-like shape extending along the X-axis. The light transmissive member 73 has a rectangular cross-sectional shape taken along a plane along the YZ plane and is elongated in the X-axis direction, as shown in FIG. 3. Out of the two end surfaces of the light transmissive member 73, which intersect with the X-axis, it is assumed that the end surface facing the first end surface 51a of the wavelength converter 51 is a first end surface 73a, and that the end surface facing the second end surface 51b of the wavelength converter 51 is a second end surface 73b, as shown in FIG. 2. Out of the side surfaces of the light transmissive member 73, it is assumed that the side surface in contact with the first side surface 51c and the second side surface 51d of the wavelength converter 51 is a first side surface 73c, and that the side surface opposite the first side surface 73c is the second side surface 73d. Note that the light transmissive member 73 may have a shape other than a plate-like shape (cuboidal shape).

It is desirable that the thermal conductivity of the light transmissive member 73 is higher than the thermal conductivity of the wavelength converter 51. Examples of the material of the light transmissive member 73 that satisfies the condition described above include SiC, GaN, MgO, YAG, sapphire, and diamond. According to the configuration described above, since heat of the wavelength converter 51 is efficiently transferred to the light transmissive member 73, an increase in temperature of the wavelength converter 51 can be suppressed. A decrease in conversion efficiency due to an increase in the temperature of the wavelength converter 51 can thus be suppressed.

The second light source 82 includes a first light emitter 821 and a second light emitter 822. The number of the light emitters provided in the second light source 82 is two in the present embodiment, but is not limited to a specific number. The light emitters 821 and 822 emit blue beams B1 and B2 having the second wavelength band toward the light transmissive member 73. The first light emitter 821 and the second light emitter 822 are configured with chip-shaped laser diodes (LDs) that emit the blue beams B1 and B2. Configuring the light emitters 821 and 822 with LDs, which are point light sources, allows the parallelizing system 83 to produce parallelized light. In the present embodiment, the light emitters 821 and 822 are disposed so as to face the second end surface 73b of the light transmissive member 73, which constitutes the first light guide 71. The ellipses labeled with the shown in FIG. 3 reference characters B1 and B2 diagrammatically show the intensity distributions of the blue beams B1 and B2. The second wavelength band is, for example, a blue wavelength band ranging from 440 nm to 450 nm. The center wavelength of the second wavelength band is, for example, 445 nm. The blue beams B1 and B2 constitute the blue light B output from the second light source. The blue light LB in the present embodiment corresponds to the second light in the claims.

The light emitters 821 and 822 are each so disposed that the light emitting surface of the laser diode chip faces the +X side, that the long-side direction of the rectangular light emitting surface coincides with the Y-axis direction, and that the short-side direction of the light emitting surface coincides with the Z-axis direction. The center axes of the blue beams B1 and B2 emitted from the light emitters 821 and 822 are parallel to the X-axis. The angles of divergence of the blue beams B1 and B2 in the plane containing the Y-axis direction differ from those in the plane containing the Z-axis direction, and the angle of divergence in the plane containing the Z-axis direction is sufficiently greater than the angle of divergence in the plane containing the Y-axis direction. The blue beams B1 and B2 emitted from the light emitters 821 and 822 therefore have an elongated elliptical cross-sectional shape perpendicular to the center axes of the blue beams B1 and B2 with the major axis direction of the elliptical shapes coinciding with the Z-axis direction, the minor axis direction of the elliptical shapes coinciding with the Y-axis direction, as shown in FIG. 3.

The parallelizing system 83 is disposed on the light exiting side of the second light source 82. The parallelizing system 83 includes a first parallelizing element 831 and a second parallelizing element 832. The first parallelizing element 831 and the second parallelizing element 832 are each configured with a collimator lens. The first parallelizing element 831 is disposed on the light exiting side of the first light emitter 821 and parallelizes the blue beam B1 emitted from the first light emitter 821. The second parallelizing element 832 is disposed on the light exiting side of the second light emitter 822 and parallelizes the blue beam B2 emitted from the second light emitter 822.

The incident angle adjusting system 45 is disposed between the second light source 82 and the first light guide 71 and between the second light source 82 and the second light guide 72. The incident angle adjusting system 45 adjusts the angle of incidence of the blue light B output from the second light source 82 with respect to the wavelength converter 51. The incident angle adjusting system 45 includes a first convex lens 451 and a second convex lens 452. The configuration in which the incident angle adjusting system 45 includes the two convex lenses 451 and 452 is shown by way of example, and the number of the convex lenses is not limited to a specific number, and may be three or more. The curvature of the lens surface of the first convex lens 451 and the curvature of the lens surface of the second convex lens 452 differ from each other. That is, the focal length of the first convex lens 451 and the focal length of the second convex lens 452 differ from each other. The first convex lens 451 and the second convex lens 452 are interchangeable with each other. A specific configuration of the incident angle adjusting system 45 may include a configuration in which the two convex lenses 451 and 452 are fixed onto a rotatable support member and rotating the support member allows a convex lens to be used to be switched from one to the other, for example, like the turret of a microscope. The configuration described above is, however, not necessarily employed.

The second optical layer 62 is disposed on the –X side of the wavelength converter 51, the first light guide 71, and the second light guide 72. Specifically, the second optical layer 62 is provided so as to face the second end surface 51b of the wavelength converter 51 and the second end surface 73b of the light transmissive member 73. The second optical layer 62 is configured with a dielectric multilayer film that transmits blue light and reflects yellow light. Therefore, the blue light B output from the second light source 82 passes through the parallelizing system 83 and the incident angle adjusting system 45, then passes through the second optical layer 62, and enters the first light guide 71 and the second light guide 72. The yellow fluorescence Y, into which the excitation light E is converted by the wavelength converter 51, propagates toward the –X side in the first light guide 71 and the second light guide 72, is reflected off the second optical layer 62 when incident on the second optical layer 62, and propagates toward the +X side in the first light guide 71 and the second light guide 72.

The reflection layers 65 are disposed on opposite sides of the first light guide 71, the second light guide 72, and the wavelength converter 51 in the Z-axis direction, as shown in FIG. 3. The reflection layers 65 reflect the excitation light E, the yellow fluorescence Y, and the blue light B. The reflection layers 65 therefore reflect the excitation light E that does not directly enter the wavelength converter 51 but is incident on the reflection layers 65 to cause the reflected excitation light E to enter the wavelength converter 51. The efficiency of the conversion from the excitation light E into the yellow fluorescence Y can thus be increased. The reflection layers 65 further reflect the yellow fluorescence Y and the blue light B propagating through the interior of the first light guide 71 and the second light guide 72. Loss of the yellow fluorescence Y and the blue light B can thus be suppressed. The reflection layers 65 are each configured, for example, with a metal film, a dielectric multilayer film, or a scattering layer.

The optical integration system 90 is provided on the light exiting side of the light source apparatus 30A, as shown in FIG. 1. The optical integration system 90 includes a first lens array 91 and a second lens array 92. The optical integration system 90, along with the superimposing system 94, functions as a homogenizing illumination system that homogenizes the intensity distribution of the white light LW output from the light source apparatus 30A at the light modulators 400R, 400G, and 400B, which are illumination receiving regions. The white light LW output from the light source apparatus 30A enters the first lens array 91.

The first lens array 91 includes multiple first lenses 91a. The multiple first lenses 91a are arranged in a matrix in a plane parallel to the YZ-plane perpendicular to the optical axis AX1 of the illuminator 20. The multiple first lenses 91a divide the white light LW output from the light source apparatus 30A into multiple sub-luminous fluxes. The first lenses 91a each have a quadrangular shape substantially similar to the shape of an image formation region of each of the light modulators 400R, 400G, and 400B. The sub-luminous fluxes output from the first lens array 91 are therefore efficiently incident on the image formation region of each of the light modulators 400R, 400G, and 400B.

The white light LW output from the first lens array 91 travels toward the second lens array 92. The second lens array 92 is disposed so as to face the first lens array 91. The second lens array 92 includes multiple second lenses 92a corresponding to the multiple first lenses 91a of the first lens array 91. The second lens array 92, along with the superimposing system 94, forms images of the multiple first lenses 91a of the first lens array 91 in the vicinity of the image formation region of each of the light modulators 400R, 400G, and 400B. The multiple second lenses 92a are arranged in a matrix in a plane parallel to the YZ plane perpendicular to the optical AX1 of the illuminator 20. The superimposing system 94 is configured with a single convex lens.

In the present embodiment, the first lenses 91a of the first lens array 91 and the second lenses 92a of the second lens array 92 have the same size, but may have sizes different from each other. Furthermore, in the present embodiment, the first lenses 91a of the first lens array 91 and the second lenses 92a of the second lens array 92 are disposed at positions where the optical axes thereof coincide with each other, but may be disposed with the optical axes thereof shifted from each other.

The polarization converter 97 converts the polarization directions of the white light LW output from the second lens array 92. Specifically, the polarization converter 97 converts each of the sub-luminous fluxes, into which the white light LW is divided by the first lens array 91 and which are output from the second lens array 92, into linearly polarized light. The polarization converter 97 includes polarization separation layers (not shown), reflection layers (not shown), and phase retardation layers (not shown). The polarization separation layers transmit one linearly polarized component of the polarized components contained in the white light LW output from the light source apparatus 30A with no change in the state of polarization, and reflects the other linearly polarized component in a direction perpendicular to the optical axis AX1. The reflection layers reflect the other linearly polarized component reflected off the polarization separation layers in a direction parallel to the optical axis AX1. The phase retardation layers convert the other linearly polarized component reflected off the reflection layers into the one linearly polarized component.

The behavior of the light in the light source apparatus 30A according to the present embodiment will be described below.

In the light source apparatus 30A, the excitation light E output from the first light source 41 passes through the first optical layers 61 and the light transmissive member 73 and enters the wavelength converter 51, as shown in FIG. 2.

When the excitation light E enters the wavelength converter 51, the phosphor contained in the wavelength converter 51 is excited, and emits the yellow fluorescence Y from random light emission points. In this process, the excitation light E having entered the phosphor is diffused and propagates to a region wider than the region on which the excitation light E is incident, so that the width of the region from which the yellow fluorescence Y is emitted widens, that is, what is called a smear of the yellow fluorescence Y is produced.

The yellow fluorescence Y incident on the first side surface 51*c* and the second side surface 51*d* from the light emission points in the wavelength converter 51 at angles of incidence smaller than the critical angle exits out of the wavelength converter 51, enters the light transmissive member 73, and propagates through the interior of the light transmissive member 73. In this process, the fluorescence Y traveling toward the +X side is reflected off the first optical layers 61 and enters the wavelength converter 51 again. In the present embodiment, since the wavelength converter 51 is configured with a scattering phosphor, the yellow fluorescence Y scatters in the wavelength converter 51, and exits out of the wavelength converter 51 into the light transmissive member 73 again, propagates through the light transmissive member 73, and then exits out of the light transmissive member 73 via the first end surface 73*a*.

The yellow fluorescence generated in the wavelength converter 51 and incident on the first side surface 51*c* and the second side surface 51*d* of the wavelength converter 51 at angles of incidence greater than or equal to the critical angle is temporarily totally reflected off the first side surface 51*c* and the second side surface 51*d* of the wavelength converter 51. In the present embodiment, however, since the wavelength converter 51 is configured with a scattering phosphor, the traveling directions of the yellow fluorescence change inside the wavelength converter 51, so that the angles of incidence of the yellow fluorescence Y with respect to the first side surface 51*c* and the second side surface 51*d* of the wavelength converter 51 change. As a result, the yellow fluorescence Y exits out of the wavelength converter 51 into the light transmissive member 73, propagates through the light transmissive member 73, and then exits out of the light transmissive member 73 via the first end surface 73*a*.

The yellow fluorescence Y traveling through the light transmissive member 73 toward the −X side and reaching the second optical layer 62 is reflected off the second optical layer 62, then travels toward the +X side, and follows the same path as the yellow fluorescence Y described above. That is, the yellow fluorescence Y propagates through the interior of the light transmissive member 73 or the wavelength converter 51 while being repeatedly reflected off the first optical layers 61 and the first side surface 51*c* or the second side surface 51*d* of the wavelength converter 51, and exits out via the first end surface 73*a* of the light transmissive member 73 or the first end surface 51*a* of the wavelength converter 51.

In contrast, the blue beam B1 emitted from the first light emitter 821 of the second light source 82 is parallelized by the first parallelizing element 831 of the parallelizing system 83. The blue beam B2 emitted from the second light emitter 822 of the second light source 82 is parallelized by the second parallelizing element 832 of the parallelizing system 83. The blue light B having passed through the parallelizing system 83 is then collected by the first convex lens 451 of the incident angle adjusting system 45. In this process, the blue beams B1 and B2, which constitute the blue light B, are each so refracted that the first convex lens 451 causes the parallelized blue beams B1 and B2 to each approach the optical axis AX1.

The blue beam B1 having entered the light transmissive member 73, specifically, the first light guide 71 thus travels obliquely through the interior of the light transmissive member 73, and is incident on the wavelength converter 51 at random positions on the first side surface 51*c*. Similarly, the blue beam B2 having entered the light transmissive member 73, specifically, the second light guide 72 travels obliquely through the interior of the light transmissive member 73, and is incident on the wavelength converter 51 at random positions on the second side surface 51*d*. Part of the blue beams B1 and B2 having entered the wavelength converter 51 contributes as excitation light to the wavelength conversion, is converted into the yellow fluorescence Y, which travels through the interior of the light transmissive member 73, and exits out of the light transmissive member 73 via the first end surface 73*a*. The other part of the blue beams B1 and B2 does not contribute to the wavelength conversion, but exits as the blue light B out of the light transmissive member 73 via the first end surface 73*a*.

The light source apparatus 30A can thus output the white light LW, which is the combination of the yellow fluorescence Y output via the first end surface 51*a* of the wavelength converter 51 and the first end surface 73*a* of the light transmissive member 73 and the blue light B output via the first end surface 73*a* of the light transmissive member 73. The light source apparatus 30A, which therefore outputs the white light LW having small etendue, can reduce the loss of the white light LW in the optical integration system 90 and other optical members disposed downstream from the light source apparatus 30A. As a result, the efficiency at which the white light LW is used in the light source apparatus 30A can be improved.

Advantages of First Embodiment

The light source apparatus 30A according to the present embodiment includes the first light source 41, which outputs the excitation light E, the second light source 82, which outputs the blue light B, the wavelength converter 51, which converts the excitation light E and the blue light B into the yellow fluorescence Y, the first optical layers 61, which are disposed between the first light source 41 and the wavelength converter 51, transmits the excitation light E, and reflects the fluorescence Y, the first light guide 71 and the second light guide 72, which are disposed between the first optical layers 61 and the wavelength converter 51 and guide the excitation light E, the blue light B, and the yellow fluorescence Y, the incident angle adjusting system 45, which is disposed between the second light source 82 and the light guides 71, 72 and adjusts the angle of incidence of the blue light B with respect to the wavelength converter 51, and the second optical layer 62, which is disposed between the incident angle adjusting system 45 and the light guides 71, 72, transmits the blue light B, and reflects the yellow fluorescence Y. The wavelength converter 51 has the first end surface 51*a* and the second end surface 51*b*, which face opposite sides, and the first side surface 51*c* and the second side surface 51*d*, which intersect with the first end surface 51*a* and the second end surface 51*b*. The excitation light E output from the first light source 41 enters the wavelength converter 51 via the first optical layers 61 and the light guides 71 and 72 and then via the first side surface 51*c* and the second side surface 51*d*. The yellow fluorescence Y, into which the excitation light E is converted by the wavelength converter 51, travels through the light guides 71 and 72 and exits via the first end surface 73*a*. The blue light B output from the second light source 82 enters the incident angle adjusting system 45, which adjusts the angle of incidence of the blue light B, and the resultant blue light B is incident on the second end surface 73*b* via the second optical layer 62. Part of the blue light B enters the wavelength converter 51 via the first side surface 51*c* and the second side surface 51*d* and is converted into the yellow fluorescence Y, and the other part of the blue light B exits via the first end surface 73*a*.

In the related-art light source apparatus, in which the blue LEDs are disposed so as to face a side surface of the transparent rod, the blue light enters the transparent rod via the side surface thereof, so that most of the blue light is incident on the side surfaces of the transparent rod multiple times at angles of incidence smaller than the critical angle before reaching the end surface of the transparent rod. A large amount of the blue light therefore leaks out of the transparent rod via the side surfaces thereof, so that the balance between the amount of the yellow light and the amount of the blue light deteriorates. The related-art light source apparatus, however, does not include any element that adjusts the ratio between the amount of the yellow light and the amount of the blue light, and therefore has a problem, that is, desired white light cannot be produced. Sufficiently reducing the amount of the yellow light allows adjustment of the ratio, but the amount of the white light is reduced. To address the problem described above, the light source apparatus 30A according to the present embodiment includes the incident angle adjusting system 45, in which the first convex lens 451 and the second convex lens 452 having focal lengths different from each other are interchangeable with each other, and interchanging the first convex lens 451 and the second convex lens 452 allows adjustment of the angle of incidence of the blue light B with respect to the first side surface 51*c* and the second side surface 51*d* of the wavelength converter 51.

For example, it is assumed that the focal length of the first convex lens 451 is longer than the focal length of the second convex lens 452. That is, it is assumed that the curvature of the lens surface of the first convex lens 451 is smaller than the curvature of the lens surface of the second convex lens 452. In this case, using the first convex lens 451 relatively increases the angle of incidence of the blue light B with respect to the first side surface 51*c* and the second side surface 51*d* of the wavelength converter 51, so that the blue light B enters a region relatively close to the first end surface 51*a* of the wavelength converter 51, as shown in FIG. 2. In this case, the blue light B travels through the light guides 71 and 72 for a relatively long distance and then enters the wavelength converter 51 at a position close to the light exiting port. A relatively small proportion of the blue light B therefore contributes to the wavelength conversion and is converted into the yellow fluorescence Y, so that the ratio of the amount of the blue light to the amount of the yellow light increases. In contrast to the above, using the second convex lens 452 relatively decreases the angle of incidence of the blue light B with respect to the first side surface 51*c* and the second side surface 51*d* of the wavelength converter 51, so that the blue light B enters a region relatively close to the second end surface 51*b* of the wavelength converter 51. In this process, a relatively large proportion of the blue light B contributes to the wavelength conversion and is converted into the yellow fluorescence Y, so that the ratio of the amount of the blue light to the amount of the yellow light decreases.

As described above, the light source apparatus 30A according to the present embodiment, which can adjust the ratio between the amount of the yellow fluorescence Y and the amount of the blue light B by exchanging the first convex lens 451 and the second convex lens 452 of the incident angle adjusting system 45 with each other, can produce white light LW having a desired color without a decrease in the amount of entire light. The present embodiment has been described with reference to the case where two convex lenses are used, and a larger number of convex lenses can be used to make finer adjustment of the ratio between the amount of the yellow fluorescence Y and the amount of the blue light B. Furthermore, even when the white balance of the white light LW deteriorates due to over-time degradation of the LDs that constitute the second light source 82 and the LEDs that constitute the first light source 41, over-time degradation of the phosphor of the wavelength converter 51, and the like, the light source apparatus 30A according to the present embodiment can adjust the ratio of the amount of the yellow fluorescence Y and the amount of the blue light B to produce white light having an intended white balance.

The present discloser conducted a simulation for calculating the ratio between the amount of the blue light and the amount of the yellow light by changing the focal length of a convex lens as the incident angle adjusting system. As a result, when the focal length (focal position) of the convex lens is gradually increased so that the focal position changes from the position of the second end surface 51*b* of the wavelength converter 51 to the position of the first end surface 51*a* thereof, it is ascertained that the ratio between the amount of the blue light and the amount of the yellow light can be greatly changed. For example, in a specific condition of the simulation, when the focal position of the convex lens is caused to coincide with the second end surface 51*b* of the wavelength converter 51, the ratio between the amount of the blue light and the amount of the yellow light becomes about 18, and when the focal position of the convex lens is caused to coincide with the first end surface 51*a* of the wavelength converter 51, the ratio between the amount of the blue light and the amount of the yellow light becomes about 80%. This means that when the focal position of the convex lens is set at the second end surface 51*b* of the wavelength converter 51, most of the blue light is converted into yellow light, and there is almost no component output as the blue light, whereas when the focal position of the convex lens is set at the first end surface 51*a* of the wavelength converter 51, about 80% of the blue light is output as the blue light.

In the light source apparatus 30A according to the present embodiment, the wavelength converter 51 has the first side surface 51*c* and the second side surface 51*d*, which face opposite sides, the light guide includes the first light guide 71 disposed so as to face the first side surface 51*c* and the second light guide 72 disposed so as to face the second side surface 51*d*, and the first light source 41 includes the third light source 43, which causes the excitation light E to enter the wavelength converter 51 via the first light guide 71, and the fourth light source 44, which causes the excitation light E to enter the wavelength converter 51 via the second light guide 72.

According to the configuration described above, since the first side surface 51*c* and the second side surface 51*d* of the wavelength converter 51 are each in contact with the light transmissive member 73, heat of the wavelength converter 51 is efficiently transferred to the light transmissive member 73, so that an increase in the temperature of the wavelength converter 51 is suppressed. A decrease in wavelength conversion efficiency due to an increase in the temperature of the wavelength converter 51 can thus be suppressed. Furthermore, since the excitation light E output from each of the third light source 43 and the fourth light source 44 enters the wavelength converter 51 via the two side surfaces 51*c* and 51*d* thereof, a sufficient amount of the excitation light E can be ensured, so that a sufficient amount of the yellow fluorescence Y can be ensured.

The projector 10 according to the present embodiment includes the light source apparatus 30A, the light modulators 400R, 400G, and 400B, which modulate the light output from the light source apparatus 30A, and the projection optical apparatus 600, which projects the light modulated by the light modulators 400R, 400G, and 400B.

According to the configuration described above, since the light source apparatus 30A outputs the white light LW, it is not necessary to provide a light source apparatus that outputs blue light separately from the light source apparatus that outputs yellow fluorescence, and a projector 10 having a highly efficient and simple configuration can be realized.

Second Embodiment

A second embodiment of the present disclosure will be described below with reference to FIG. 4.

The basic configuration of a light source apparatus according to the second embodiment is the same as that in the first embodiment, and the configuration of an incident angle adjusting system differs from that in the first embodiment. The basic configuration of the light source apparatus will therefore not be described.

Figure 4:
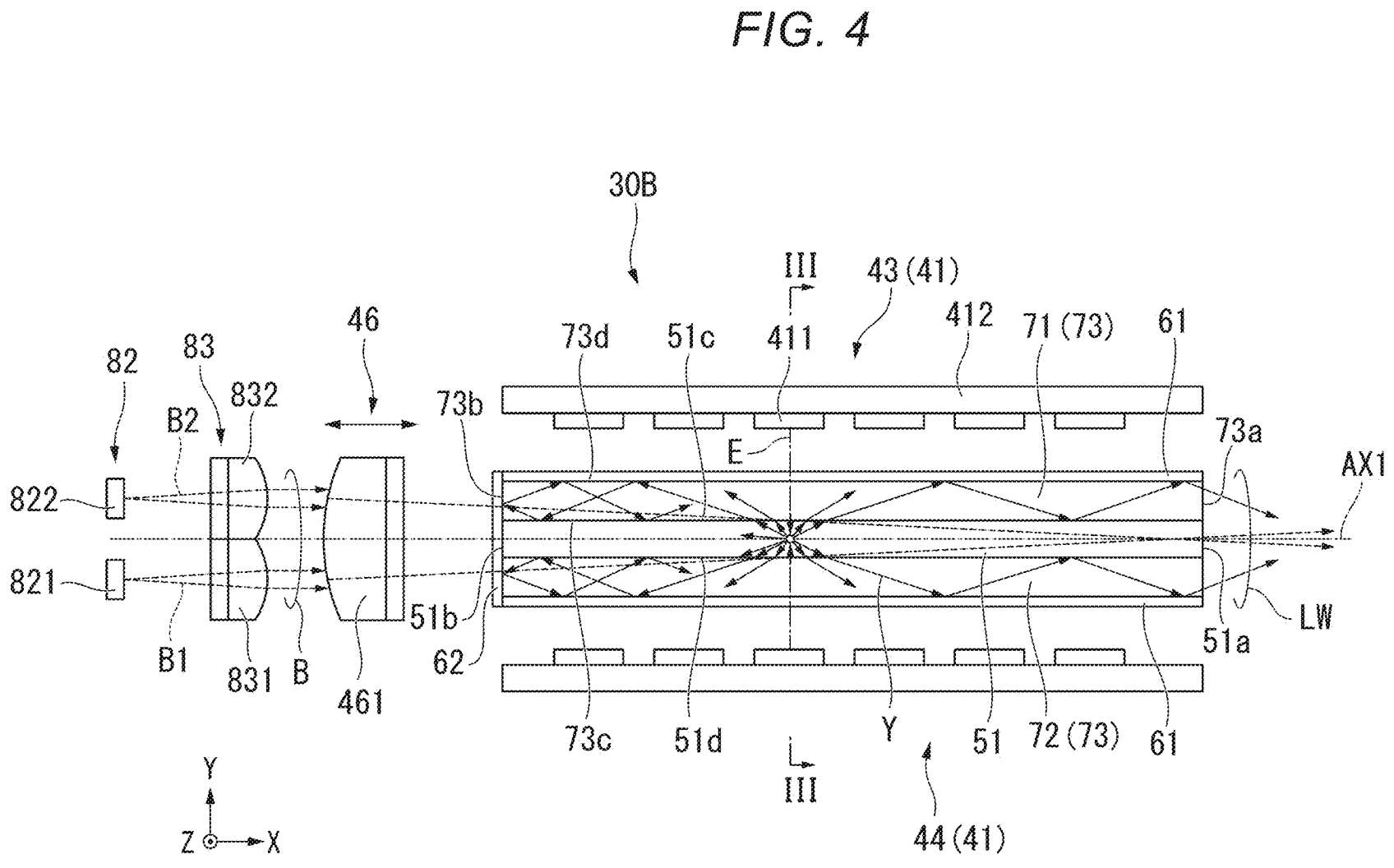

FIG. 4 is a cross-sectional view of a light source apparatus 30B according to the second embodiment taken along the XY plane. In FIG. 4, elements common to those in the drawings used in the first embodiment have the same reference characters and will not be described.

The light source apparatus 30B according to the present embodiment includes the first light source 41, the wavelength converter 51, the first light guide 71, the second light guide 72, the first optical layers 61, the second light source 82, the parallelizing system 83, an incident angle adjusting system 46, the second optical layer 62, and reflection layers (not shown), as shown in FIG. 4.

The incident angle adjusting system 46 includes a convex lens 461. The convex lens 461 is movable along the optical axis direction thereof (X-axis direction). A specific configuration of the incident angle adjusting system 46 may include a configuration in which the convex lens 461 is supported on a guide rail extending in the optical axis direction and caused to slide and move along the guide rail. The configuration described above is, however, not necessarily employed.

The other configurations of the light source apparatus 30B are the same as those of the light source apparatus 30A according to the first embodiment.

In the incident angle adjusting system 46 in the present embodiment, the convex lens 461 is moved toward the side far from the parallelizing system 83 (+X side) relatively increases the angle of incidence of the blue light B with respect to the first side surface 51c and the second side surface 51d of the wavelength converter 51, so that the blue light B enters a region relatively close to the first end surface 51a of the wavelength converter 51. In this process, a relatively small proportion of the blue light B contributes to the wavelength conversion and is converted into the yellow fluorescence Y, so that the ratio of the amount of the blue light to the amount of the yellow light increases.

In contrast to the above, moving the convex lens 461 toward the side close to the parallelizing system 83 (−X side) relatively decreases the angle of incidence of the blue light B with respect to the first side surface 51c and the second side surface 51d of the wavelength converter 51, so that the blue light B enters a region relatively close to the second end surface 51b of the wavelength converter 51. In this process, a relatively large proportion of the blue light B contributes to the wavelength conversion and is converted into the yellow fluorescence Y, so that the ratio of the amount of the blue light to the amount of the yellow light decreases.

Advantages of Second Embodiment

Also in the present embodiment, moving the convex lens 461 of the incident angle adjusting system 46 along the optical axis allows adjustment of the ratio between the amount of the yellow fluorescence Y and the amount of the blue light B, so that the same advantages as those provided by the first embodiment can be provided, for example, desired white light LW can be produced.

Third Embodiment

A third embodiment of the present disclosure will be described below with reference to FIGS. 5 and 6.

The basic configuration of a light source apparatus according to the third embodiment is the same as that in the first embodiment, and the configuration of an incident angle adjusting system differs from that in the first embodiment. The basic configuration of the light source apparatus will therefore not be described.

Figure 5:
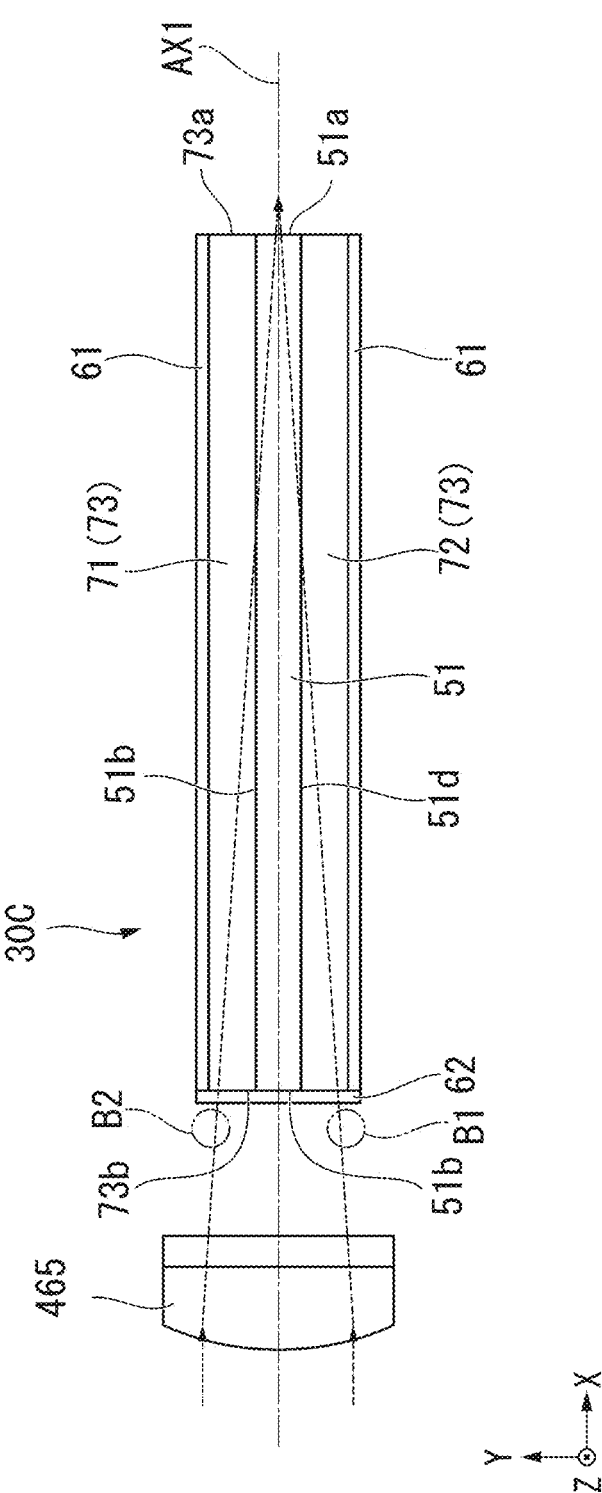
FIG. 5 shows an effect of a light source apparatus according to a third embodiment, and shows the light source apparatus viewed in a Z-axis direction.

FIG. 5 shows an effect of a light source apparatus 30C according to the third embodiment, and shows the light source apparatus 30C viewed in the Z-axis direction. FIG. 6 shows the effect of the light source apparatus 30C according to the third embodiment, and shows the light source apparatus 30C viewed in the Y-axis direction. In FIGS. 5 and 6, elements common to those in the drawings used in the first embodiment have the same reference characters and will not be described.

In the first and second embodiments, the convex lens(es) that constitutes the incident angle adjusting system is configured with a typical convex lens having a focal length in the Y-axis direction equal to the focal length in the Z-axis direction. In contrast, in the light source apparatus 30C according to the present embodiment, a convex lens 465, which constitutes the incident angle adjusting system, is configured with an anamorphic lens as indicated by the solid lines in FIGS. 5 and 6. The radius of curvature of the lens surface of the anamorphic lens along the Y-axis direction is longer than the radius of curvature of the lens surface thereof along the Z-axis direction. That is, the curvature of the lens surface of the anamorphic lens along the Y-axis direction is smaller than the curvature of the lens surface thereof along the Z-axis direction. In other words, the focal length of the lens surface of the anamorphic lens along the Y-axis direction is longer than the focal length of the lens surface thereof along the Z-axis direction. As described in the first embodiment, the major axis direction of the elliptical cross-sectional shape of the blue light B perpendicular to the optical axis is the Z-axis direction, and the minor axis direction of the elliptical cross-sectional shape is the Y-axis direction. Therefore, in other words, the focal length of the anamorphic lens in the major axis direction of the cross-sectional shape of the blue light B perpendicular to the optical axis is shorter than the focal length of the anamorphic lens in the minor axis direction of the cross-sectional shape.

The other configurations of the light source apparatus 30C are the same as those of the light source apparatus 30A according to the first embodiment and the light source apparatus 30B according to the second embodiment.

Advantages of Third Embodiment

Also in the present embodiment, exchanging the convex lens 465 of the incident angle adjusting system or moving the convex lens 465 along the optical axis allows adjustment of the ratio between the amount of the yellow fluorescence Y and the amount of the blue light B, so that the same advantages as those provided by the first embodiment can be provided, for example, desired white light LW can be produced.

The present embodiment further provides the advantages below.

The present discloser has found that, to produce ideal white light in actual design of the light source apparatus, the focal position of the convex lens only needs to be set at the first end surface 51*a* of the wavelength converter 51 or a position farther than the first end surface 51*a*. In this case, when viewed in the major axes direction of the elliptical cross-sectional shapes of the blue beams B1 and B2 perpendicular to the optical axes thereof, end portions of the blue beams B1 and B2 in the minor axis direction cannot enter the light transmissive member 73 due to the relative relationship among the dimensions of the members, resulting in loss of the blue light B in some cases, as shown in FIG. 5.

Figure 6:
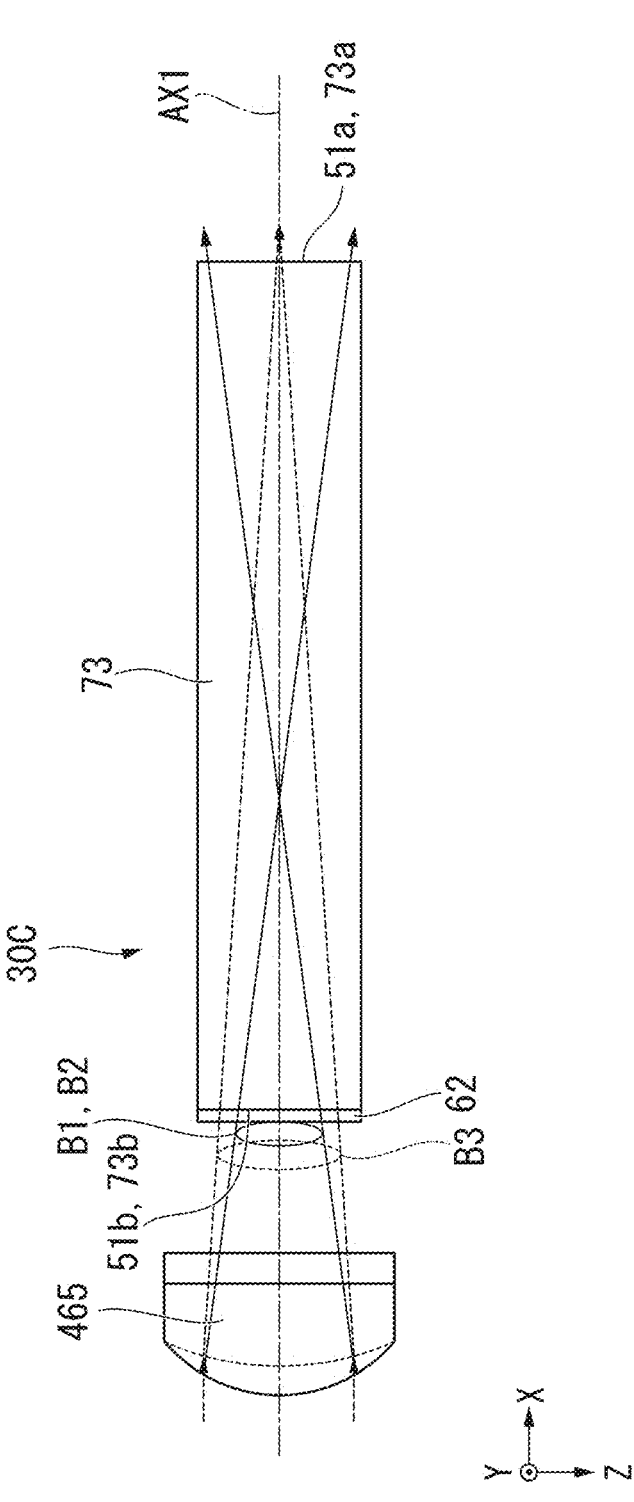
FIG. 6 shows the effect of the light source apparatus according to the third embodiment, and shows the light source apparatus viewed in a Y-axis direction.

In the situation described above, when a convex lens having a focal length in the Z-axis direction equal to the focal length in the Y-axis direction is used in place of an anamorphic lens, the state indicated by the broken lines B3 in FIG. 6 is produced. That is, when viewed in the minor axis direction of the elliptical cross-sectional shape of the blue beam B3 perpendicular to the optical axis, opposite ends of the blue beam B3 in the major axis direction cannot enter the light transmissive member 73, so that the loss of the blue light B further increases. Therefore, to solve the problem described above, a convex lens 465 configured with an anamorphic lens and having a focal length in the Z-axis direction shorter than the focal length in the Y-axis direction is used, as indicated by the solid lines in FIG. 6. In this case, the elliptical cross-sectional shapes of the blue beams B1 and B2 perpendicular to the optical axes thereof are smaller in the major axis direction than an elliptical shape B3 in the case where a typical convex lens is used. The loss of the blue light B at the second end surface 73*b* of the light transmissive member 73 can thus be suppressed, so that the efficiency at which the blue light B is used can be increased.

Fourth Embodiment

A fourth embodiment of the present disclosure will be described below with reference to FIG. 7.

The basic configuration of a light source apparatus according to the fourth embodiment is the same as that in the first embodiment, but the configuration of the second light source differs from that in the first embodiment. The basic configuration of the light source apparatus will therefore not be described.

Figure 7:
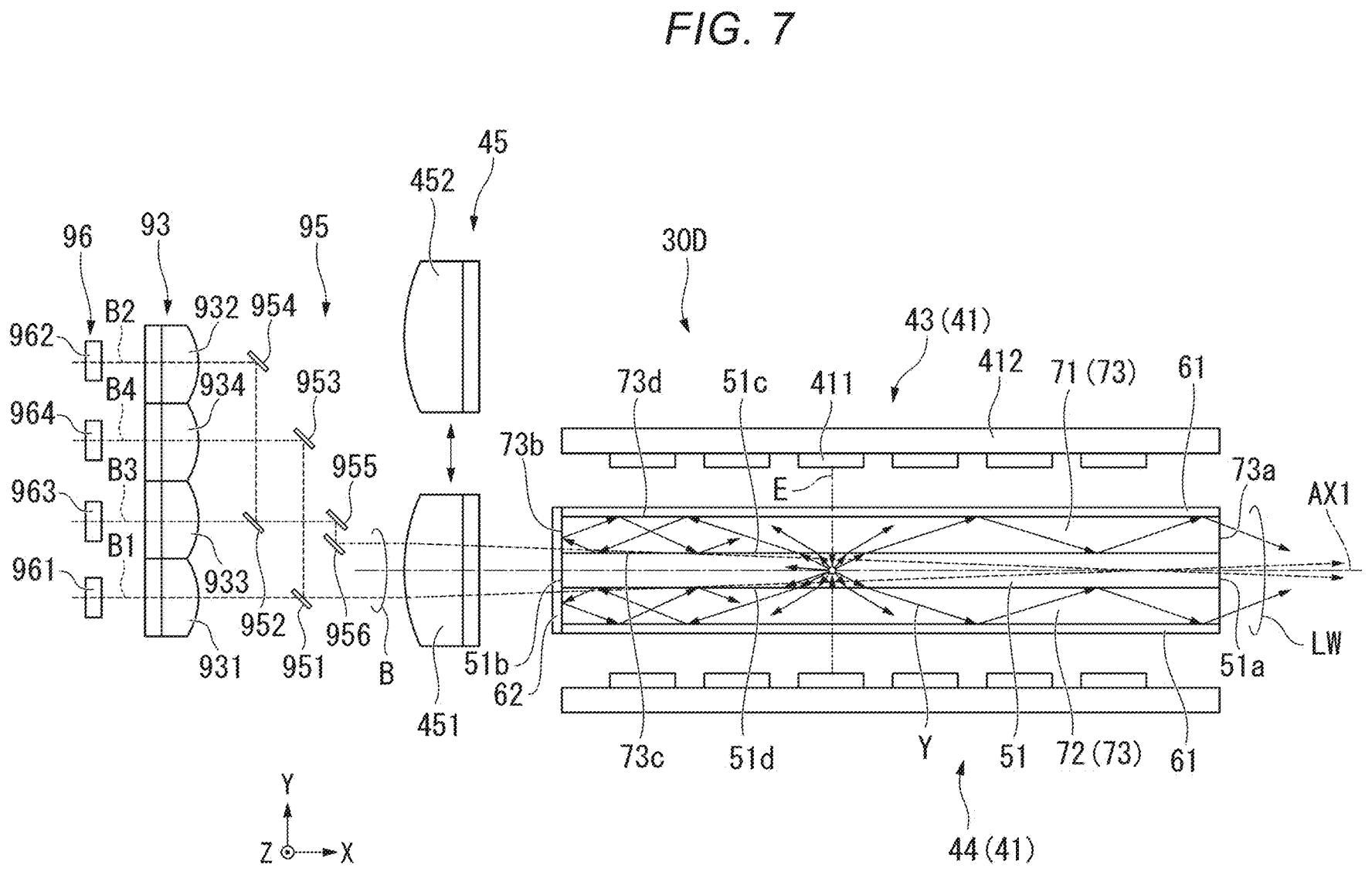

FIG. 7 is a cross-sectional view of a light source apparatus 30D according to the fourth embodiment taken along the XY plane. In FIG. 7, elements common to those in the drawings used in the first embodiment have the same reference characters and will not be described.

The light source apparatus 30D according to the present embodiment includes the first light source 41, the wavelength converter 51, the first light guide 71, the second light guide 72, the first optical layers 61, a second light source 96, a parallelizing system 93, a luminous flux width reducing system 95, the incident angle adjusting system 45, the second optical layer 62, and reflection layers (not shown), as shown in FIG. 7.

The second light source 96 includes a first light emitter 961, a second light emitter 962, a third light emitter 963, and a fourth light emitter 964. The four light emitters are arranged in the following order from the −Y side toward the +Y side: the first light emitter 961; the third light emitter 963; the fourth light emitter 964; and the second light emitter 962. The four light emitters 961, 962, 963, and 964 are configured with identical LDs that emit blue beams B1, B2, B3, and B4. However, the polarization direction of the blue beams B1 and B3 emitted from the first light emitter 961 and the third light emitter 963 differs from the polarization direction of the blue beams B2 and B4 emitted from the second light emitter 962 and the fourth light emitter 964. Specifically, the blue beams B1 and B3 emitted from the first light emitter 961 and the third light emitter 963 are P-polarized light with respect to polarization separation mirrors of the luminous flux width reducing system 95, which will be described later. The blue beams B2 and B4 emitted from the second light emitter 962 and the fourth light emitter 964 are S-polarized light with respect to the polarization separation mirrors of the luminous flux width reducing system 95, which will be described later. A half-wave plate (not shown) is therefore provided on the light exiting side of the first light emitter 961 and the third light emitter 963 or the second light emitter 962 and the fourth light emitter 964.

The parallelizing system 93 is disposed on the light exiting side of the second light source 96. The parallelizing system 93 includes a first parallelizing element 931, a second parallelizing element 932, a third parallelizing element 933, and a fourth parallelizing element 934. The first parallelizing element 931, the second parallelizing element 932, the third parallelizing element 933, and the fourth parallelizing element 934 are each configured with a collimator lens. The first parallelizing element 931 parallelizes the blue beam B1 emitted from the first light emitter 961. The second parallelizing element 932 parallelizes the blue beam B2 emitted from the second light emitter 962. The third parallelizing element 933 parallelizes the blue beam B3 emitted from the third light emitter 963. The fourth parallelizing element 934 parallelizes the blue beam B4 emitted from the fourth light emitter 964.

The luminous flux width reducing system 95 is disposed on the light exiting side of the parallelizing system 93. The luminous flux width reducing system 95 includes a first polarization separation mirror 951, a second polarization separation mirror 952, a first reflection mirror 953, a second reflection mirror 954, a third reflection mirror 955, and a fourth reflection mirror 956.

The P-polarized blue beam B1 emitted from the first light emitter 961 is parallelized by the first parallelizing element 931, then passes through the first polarization separation mirror 951, and travels toward the +X side. The S-polarized blue beam B4 emitted from the fourth light emitter 964 is parallelized by the fourth parallelizing element 934, is then reflected off the first reflection mirror 953, travels toward the first polarization separation mirror r 951, is reflected off the first polarization separation mirror 951, and is combined with the P-polarized blue beam B1 emitted from the first light emitter 961, and the combined beam travels toward the +X side. The P-polarized blue beam B3 emitted from the third light emitter 963 is parallelized by the third parallelizing element 933, then passes through the second polarization separation mirror 952, and travels toward the +X side. The S-polarized blue beam B2 emitted from the second light emitter 962 is parallelized by the second parallelizing element 932, is then reflected off the second reflection mirror 954, travels toward the second polarization separation mirror 952, is reflected off the second polarization separation mirror 952, and is combined with the P-polarized blue beam B3 emitted from the third light emitter 963, and the combined light travels toward the +X side. The blue light that is the combination of the blue beam B2 and the blue beam B3 is reflected off the third reflection mirror 955, is then reflected off the fourth reflection mirror 956, and travels toward the +X side. The luminous flux width reducing system 95 thus reduces the luminous flux width of blue light B containing the blue beams B1, B2, B3, and B4 emitted from the four light emitters 921, 922, 923, and 924.

The other configurations of the light source apparatus 30D are the same as those of the light source apparatus 30A according to the first embodiment.

Advantages of Fourth Embodiment

Also in the present embodiment, exchanging the first convex lens 451 and the second convex lens 452 of the incident angle adjusting system 45 allows adjustment of the ratio between the amount of the yellow fluorescence Y and the amount of the blue light B, so that the same advantages as those provided by the first embodiment can be provided, for example, desired white light LW can be produced.

In the light source apparatus 30D according to the present embodiment, since the number of the light emitters that constitute the second light source 96 is increased as compared with that in the first embodiment, the amount of the blue light B output from the second light source 96 can be increased. When the number of light emitters increases, however, the entire luminous flux width of the blue light B increases, so that it becomes difficult to cause the blue light B to be incident on the second end surface 73*b* of the light transmissive member 73 without causing loss of the blue light B. In this regard, in the light source apparatus 30D according to the present embodiment, since the luminous flux width of the blue light B is reduced by the luminous flux width reducing system 95 disposed upstream from the light transmissive member 73, the blue light B can be incident on the second end surface 73*b* of the light transmissive member 73 without causing loss of the blue light B. As a result, the amount of the white light LW can be increased.

Fifth Embodiment

A fifth embodiment of the present disclosure will be described below with reference to FIG. 8.

The basic configuration of a light source apparatus according to the fifth embodiment is the same as that in the first embodiment, but the configuration of the light guide differs from that in the first embodiment. The basic configuration of the light source apparatus will therefore not be described.

Figure 8:
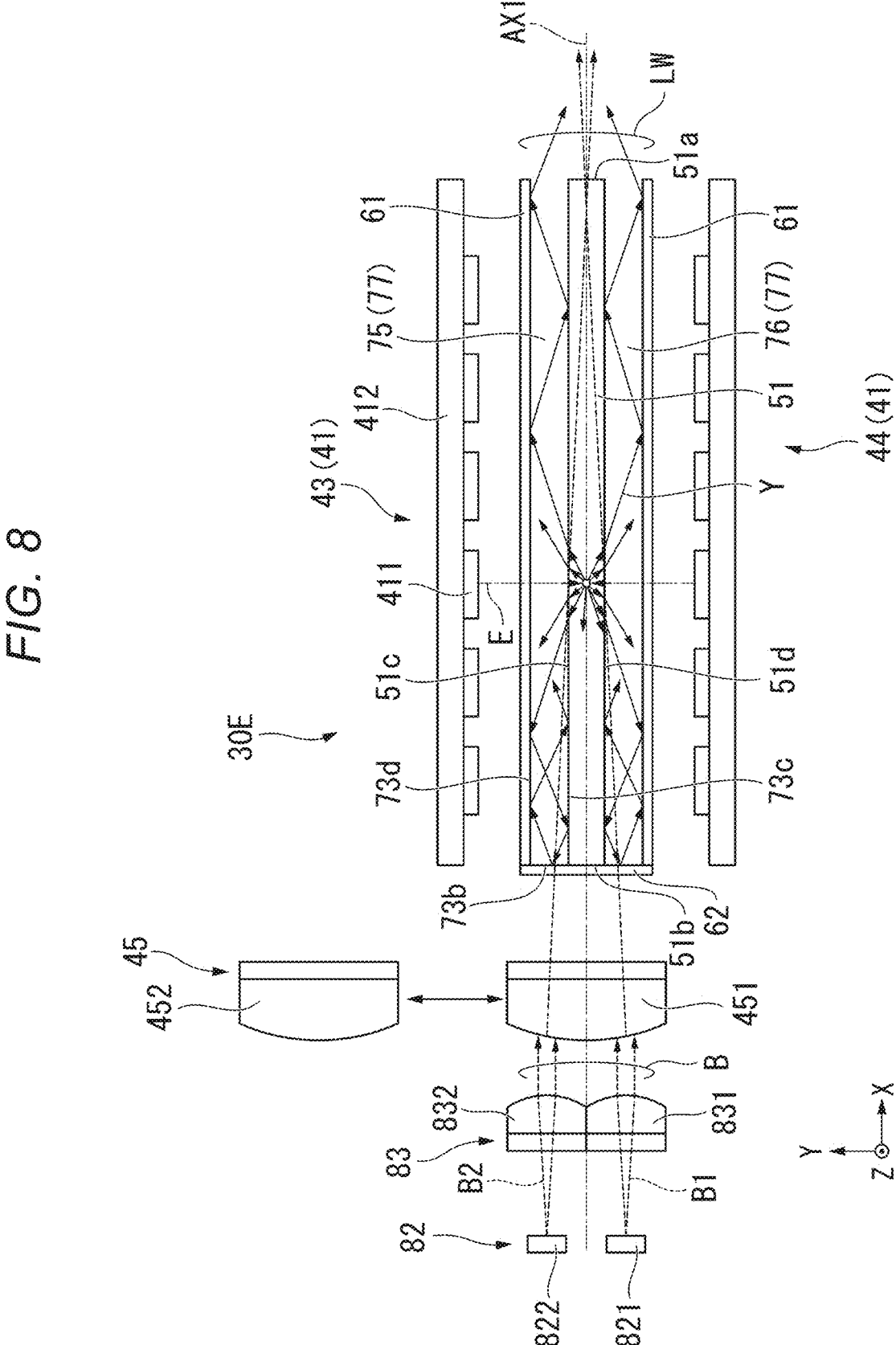
FIG. 8 is a cross-sectional view of a light source apparatus according to a fifth embodiment.

FIG. 8 is a cross-sectional view of a light source apparatus 30E according to the fifth embodiment taken along the XY plane. In FIG. 8, elements common to those in the drawings used in the first embodiment have the same reference characters and will not be described.

The light source apparatus 30E according to the present embodiment includes the first light source 41, the wavelength converter 51, a first light guide 75, a second light guide 76, the first optical layers 61, the second light source 82, the parallelizing system 83, the incident angle adjusting system 45, the second optical layer 62, and reflection layers (not shown), as shown in FIG. 8.

In the light source apparatus 30A according to the first embodiment, the first light guide 71 and the second light guide 72 are configured with the light transmissive member 73. In contrast, in the light source apparatus 30E according to the present embodiment, the first light guide 75 and the second light guide 76 are configured with an air layer 77. That is, the first optical layers 61 and the wavelength converter 51 are disposed separate from each other, and air is present between the first optical layers 61 and the wavelength converter 51. The yellow fluorescence Y, into which the excitation light E is converted by the wavelength converter 51, and the blue light B output from the second light source 82 are therefore output from a region of the air layer 77 that is a region facing the first end surface 51*a*.

The other configurations of the light source apparatus 30E are the same as those of the light source apparatus 30A according to the first embodiment.

Advantages of Fifth Embodiment

Also in the present embodiment, exchanging the first convex lens 451 and the second convex lens 452 of the incident angle adjusting system 45 allows adjustment of the ratio between the amount of the yellow fluorescence Y and the amount of the blue light B, so that the same advantages as those provided by the first embodiment can be provided, for example, desired white light LW can be produced.

In the present embodiment, since the first light guide 75 and the second light guide 76 are configured with the air layer 77, the difference in refractive index between the wavelength converter 51 and each of the light guides 75 and 76 is greater than that in the case where the first and second light guides are configured with a light transmissive member made, for example, of quartz. The angle at which the fluorescence Y is refracted when the fluorescence Y is output from the wavelength converter 51 into the light guides 75 and 76 therefore increases, so that the fluorescence Y travels in directions inclining by small angles with respect to the first side surface 51*c* and the second side surface 51*d* of the wavelength converter 51, that is, by small angles with respect to the X-axis. Since a region of each of the light guides 75 and 76 that is a region facing the first end surface 51*a* is open to the external space and does not have a refractive index interface, the fluorescence Y having reached the region of each of the light guides 75 and 76, which is a region facing the first end surface 51*a*, is output to the external space as it is without being reflected or refracted. The light source apparatus 30E according to the present embodiment can thus extract the yellow fluorescence Y at increased efficiency as compared with that in the first embodiment.

Sixth Embodiment

A sixth embodiment of the present disclosure will be described below with reference to FIG. 9.

The basic configuration of a light source apparatus according to the sixth embodiment is the same as that in the first embodiment, but the arrangement of the wavelength converter and the light guide differs from that in the first embodiment. The basic configuration of the light source apparatus will therefore not be described.

Figure 9:
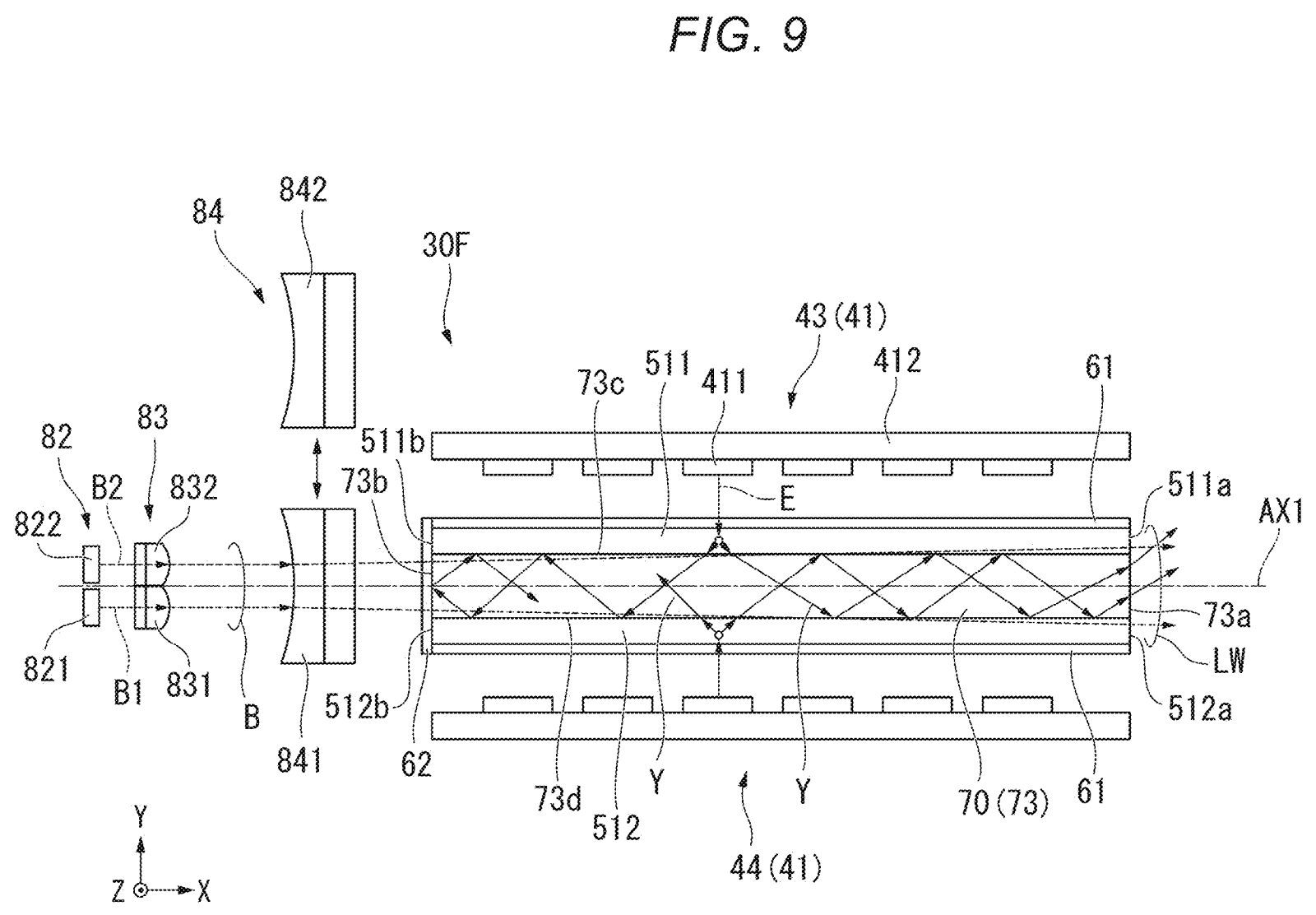

FIG. 9 is a cross-sectional view of a light source apparatus 30F according to the sixth embodiment taken along the XY plane. In FIG. 9, elements common to those in the drawings used in the first embodiment have the same reference characters and will not be described.

The light source apparatus 30F according to the present embodiment includes the first light source 41, a first wavelength converter 511, a second wavelength converter 512, a light guide 70, the first optical layers 61, the second light source 82, the parallelizing system 83, an incident angle adjusting system 84, the second optical layer 62, and reflection layers (not shown), as shown in FIG. 9.

The light source apparatus 30F according to the present embodiment includes two wavelength converters, the first wavelength converter 511 and the second wavelength converter 512. The first wavelength converter 511 and the second wavelength converter 512 have the same configuration and are disposed separate from each other in the Y-axis direction. The first wavelength converter 511 and the second wavelength converter 512 each convert the excitation light E output from the first light source 41 into the yellow fluorescence Y. The excitation light E output from the third light source 43 enters the first wavelength converter 511. The excitation light E output from the fourth light source 44 enters the second wavelength converter 512.

The light guide 70 is configured with a plate-shaped light transmissive member 73 made, for example, of quartz. The first wavelength converter 511 and the second wavelength converter 512 are bonded to two side surfaces 73c and 73d of the light transmissive member 73 with an optical adhesive. The yellow fluorescence Y, into which the excitation light E is converted by the first wavelength converter 511 and the second wavelength converter 512, is output from each of the wavelength converters 511 and 512, travels through the interior of the light guide 70, and exits out of the light guide 70 via the first end surface 73a.

The incident angle adjusting system 84 includes a first concave lens 841 and a second concave lens 842. The configuration in which the incident angle adjusting system 84 includes two concave lenses is shown by way of example, but the number of the concave lenses is not limited to a specific number, and may be three or more. The curvature of the lens surface of the first concave lens 841 and the curvature of the lens surface of the second concave lens 842 differ from each other. The first concave lens 841 and the second concave lens 842 are interchangeable with each other. Note that the incident angle adjusting system may include one concave lens, and that the concave lens may be movable in the optical axis direction, as in the second embodiment.

The other configurations of the light source apparatus 30F are the same as those of the light source apparatus 30A according to the first embodiment.

In the present embodiment, the blue light B parallelized by the parallelizing system 83 is caused to diverge by the first concave lens 841 of the incident angle adjusting system 84. In this process, since the blue light B is configured with the blue beam B1 and the blue beam B2, the blue beam B1 and the blue beam B2 are each so refracted that the first concave lens 841 causes the blue beams B1 and B2 to each shift away from the optical axis AX1 as traveling through the light transmissive member 73.

The blue beam B1 having entered the light transmissive member 73, which forms the light guide 70, via the second end surface 73b travels obliquely through the interior of the light transmissive member 73 and enters the second wavelength converter 512. Similarly, the blue beam B2 having entered the light transmissive member 73 via the second end surface 73b travels obliquely through the interior of the light transmissive member 73 and enters the first wavelength converter 511. Part of the blue beams B1 and B2 having entered the wavelength converters 511 and 512 contributes as excitation light to the wavelength conversion, is converted into the yellow fluorescence Y, which travels through the interior of the light transmissive member 73, and exits out of the light transmissive member 73 via the first end surface 73a. The other part of the blue beams B1 and B2 having entered the wavelength converter 51 does not contribute to the wavelength conversion but exits as the blue light B out of the light transmissive member 73 via the first end surface 73a.

It is assumed that the curvature of the second concave lens 842 is greater than the curvature of the first concave lens 841. In this case, exchanging the first concave lens 841 with the second concave lens 842 allows the blue beams B1 and B2 to be incident on positions closer to the second end surfaces 511b and 512b of the wavelength converters 511 and 512. The second concave lens 842 can thus be used to relatively increase the proportion of the blue light B that contributes as the excitation light to the wavelength conversion. Conversely, the first concave lens 841 can be used to cause the blue beams B1 and B2 to be incident on positions closer to the first end surfaces 511a and 512a of the wavelength converters 511 and 512 to relatively increase the proportion of the blue light B output without contributing to the wavelength conversion.

Advantages of Sixth Embodiment

Also in the present embodiment, exchanging the first concave lens 841 and the second concave lens 842 of the incident angle adjusting system 84 allows adjustment of the ratio between the amount of the yellow fluorescence Y and the amount of the blue light B, so that the same advantages as those provided by the first embodiment can be provided, for example, desired white light LW can be produced.

Seventh Embodiment

A seventh embodiment of the present disclosure will be described below with reference to FIG. 10.

The seventh embodiment is the same as the first embodiment in basic configuration of the light source apparatus, but differs from the first embodiment in that a light diffuser is added. The basic configuration of the light source apparatus will therefore not be described.

Figure 10:
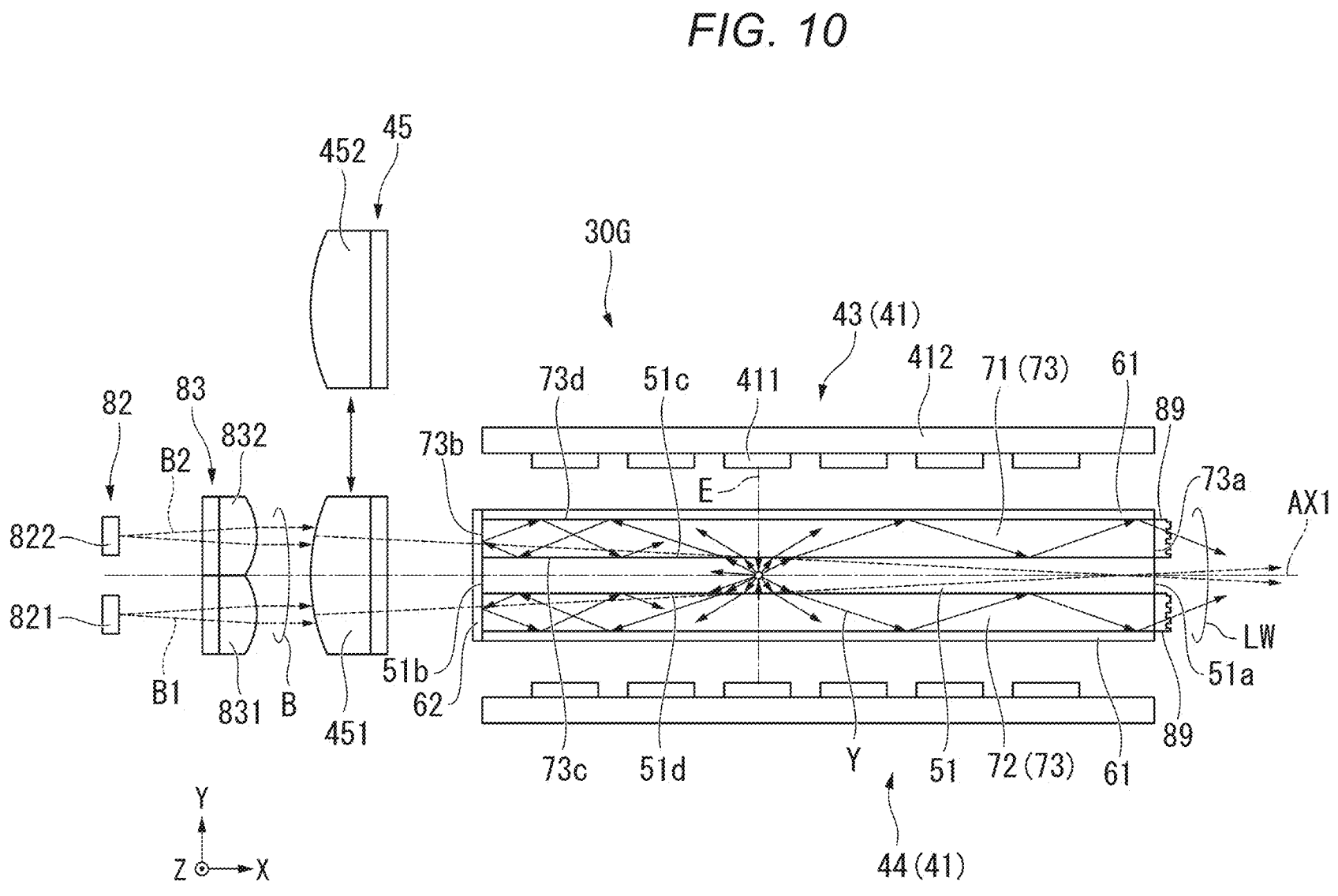

FIG. 10 is a cross-sectional view of a light source apparatus 30G according to the seventh embodiment taken along the XY plane. In FIG. 10, elements common to those in the drawings used in the first embodiment have the same reference characters and will not be described.

The light source apparatus 30G according to the present embodiment includes the first light source 41, the wavelength converter 51, the first light guide 71, the second light guide 72, the first optical layers 61, the second light source 82, the parallelizing system 83, the incident angle adjusting system 45, the second optical layer 62, light diffusers 89, and reflection layers (not shown), as shown in FIG. 10.

The light diffusers 89 are disposed at the first end surface 73a of the light transmissive member 73, which is configured with the first light guide 71 and the second light guide 72. Specifically, the light diffusers 89 are bonded to the first end surface 73a of the light transmissive member 73 with an optical adhesive. The light diffusers 89 may each be made of frosted glass having a random uneven structure. The light diffusers 89 may instead each be configured with a microlens array diffuser plate having a regular uneven structure. The light diffusers 89 diffuse the blue light B output via the first end surface 73a of the light transmissive member 73. The light diffusers 89 in the present embodiment correspond to the light diffusing section in the claims. Note that the light diffusing section may instead be the first end surface 73a of the light transmissive member 73 that is directly so processed to have unevenness.

The other configurations of the light source apparatus 30G are the same as those of the light source apparatus 30A according to the first embodiment.

Advantages of Seventh Embodiment

Also in the present embodiment, exchanging the first convex lens 451 and the second convex lens 452 of the incident angle adjusting system 45 allows adjustment of the ratio between the amount of the yellow fluorescence Y and the amount of the blue light B, so that the same advantages as those provided by the first embodiment can be provided, for example, desired white light LW can be produced.

Since the blue beams B1 and B2 propagating through the light guides 71 and 72 are each light as a result of parallelizing the light from an LD, which is a point light source, the blue beams B1 and B2 each have a small divergence angle when output via the first end surface 73a of the light transmissive member 73 and show a light orientation distribution having a thin peak. On the other hand, the fluorescence Y output from the wavelength converter 51 has a large divergence angle and shows a Lambert light orientation distribution. The white light LW, which is the combination of the blue light B and the yellow fluorescence Y, may therefore cause color unevenness in a downstream optical system due to the difference in the light orientation distribution between the blue light and the yellow light. In contrast, in the light source apparatus 30G according to the present embodiment, since the light diffusers 89 are provided at the first end surface 73a of the light transmissive member 73, the blue light B exits out of the light source apparatus 30G in the state in which the blue light B is diffused by the light diffusers 89. The light orientation distribution of the blue light B can thus be made close to the light orientation distribution of the yellow fluorescence Y, so that the color unevenness in a downstream optical system can be reduced.

Note that the technical scope of the present disclosure is not limited to the embodiments described above, and various modifications can be made thereto to the extent that the modifications do not depart from the intent of the present disclosure.

For example, in the embodiments described above, the first light source is disposed so as to face both the first and second side surfaces of the wavelength converter, and the excitation light enters the wavelength converter via both the first and second side surfaces. In place of the configuration described above, the first light source may be disposed so as to face only one of the first and second side surfaces of the wavelength converter, and the excitation light may enter the wavelength converter via the one side surface. In this case, a heat conducting member, for example, an enclosure may be brought into contact with the side surface on which the excitation light is not incident. The heat of the wavelength converter can thus be efficiently dissipated.

In addition, the specific description of the shapes, the numbers, the arrangements, the materials, and other factors of the elements of the light source apparatus and the projector are not limited to those in the embodiments described above, and can be changed as appropriate. The aforementioned embodiments have been described with reference to the case where any of the light source apparatuses according to the present disclosure is incorporated in a projector using liquid crystal panels, but not necessarily. The light source apparatuses according to the present disclosure may each be used in a projector using digital micromirror devices as the light modulators. The projector may not include multiple light modulators, and may include only one light modulator.

The aforementioned embodiments have been described with reference to the case where the light source apparatuses according to the present disclosure are each incorporated in a projector, but not necessarily. Any of the light source apparatuses according to the present disclosure may be incorporated in a lighting instrument, a headlight of an automobile, and other instruments.

SUMMARY OF PRESENT DISCLOSURE

The present disclosure is summarized below as additional remarks.

Additional Remark 1

A light source apparatus including:

a first light source configured to output first light having a first wavelength band;

a second light source configured to output second light having a second wavelength band;

a wavelength converter configured to convert the first light and the second light into third light having a third wavelength band different from the first wavelength band and the second wavelength band;

a first optical layer disposed between the first light source and the wavelength converter and configured to transmit the first light and reflect the third light;

a light guide disposed between the first optical layer and the wavelength converter and configured to guide each of the first light, the second light, and the third light;

an incident angle adjusting system disposed between the second light source and the light guide and configured to adjust an angle of incidence of the second light with respect to the wavelength converter; and a second optical layer disposed between the incident angle adjusting system and the light guide and configured to transmit the second light and reflect the third light, wherein the wavelength converter has a first surface and a second surface that face opposite sides, and a third surface that intersects with the first surface and the second surface, the first light output from the first light source enters the wavelength converter via the first optical layer and the light guide and via the third surface, the third light, into which the first light and the second light are converted by the wavelength converter, travels through the light guide, and exits out of a region on the first surface side of the light guide, the second light output from the second light source enters the incident angle adjusting system, which adjusts the angle of incidence of the second light, and the resultant second light enters a region on the second surface side of the light guide via the second optical layer, and part of the second light entering the light guide enters the wavelength converter via the third surface and is converted into the third light by the wavelength converter, and another part of the second light entering the light guide exits out of a region on the first surface side of the light guide.

According to the configuration of Additional Remark 1, the incident angle adjusting system can adjust the angle of incidence of the second light with respect to the wavelength converter to adjust the balance between the amount of the third light, into which the first light and the second light are converted by the wavelength converter, and the amount of the second light that is not converted by the wavelength converter but is output from the wavelength converter. Combined light having a desired color can thus be produced.

Additional Remark 2

The light source apparatus according to Additional Remark 1, wherein the light guide includes a light transmissive member configured to transmit the first light, the second light, and the third light, and the second light and the third light exit via an end surface of the light transmissive member that is a surface facing the first surface.

According to the configuration of Additional Remark 2, the combined light, which is the combination of the second light and the third light, can be extracted out of the light source apparatus via the light transmissive member, which constitutes the light guide. Furthermore, since heat of the wavelength converter is transferred to the light transmissive member, an increase in the temperature of the wavelength converter can be suppressed, so that a decrease in the wavelength conversion efficiency can be suppressed.

Additional Remark 3

The light source apparatus according to Additional Remark 1, wherein the light guide includes an air layer, and the second light and the third light exit out of a region on the first surface side of air layer.

According to the configuration of Additional Remark 3, the combined light, which is the combination of the second light and the third light, can be extracted out of the light source apparatus via the air layer, which constitutes the light guide. Furthermore, since the region of the air layer, which is a region facing the first surface, is open to the external space, no refraction or reflection occurs at the end surface, so that the efficiency at which the combined light is extracted can be increased.

Additional Remark 4

The light source apparatus according to any one of Additional Remarks 1 to 3, wherein the third surface of the wavelength converter has a first side surface and a second side surface that face opposite sides, the light guide includes a first light guide disposed so as to face the first side surface and a second light guide disposed so as to face the second side surface, and the first light source includes a third light source configured to cause the first light to enter the wavelength converter via the first light guide, and a fourth light source configured to cause the first light to enter the wavelength converter via the second light guide.

According to the configuration of Additional Remark 4, the amount of the first light that enters the wavelength converter can be increased, so that the amount of the third light can be increased.

Additional Remark 5

The light source apparatus according to Additional Remark 4, wherein the incident angle adjusting system includes a first convex lens and a second convex lens having focal lengths different from each other, and the first convex lens and the second convex lens are interchangeable with each other.

According to the configuration of Additional Remark 5, exchanging the first convex lens and the second convex lens with each other allows the angle of incidence of the second light with respect to the wavelength converter to be readily adjusted.

Additional Remark 6

The light source apparatus according to Additional Remark 5, wherein the first convex lens and the second convex lens are each anamorphic lens.

According to the configuration of Additional Remark 6, since the reduction factor of the second light in the specific direction can be made smaller than the reduction factor of the second light in another direction, loss of the second light at the light incident position on the light guide can be reduced, so that the efficiency at which the second light is used can be increased.

Additional Remark 7

The light source apparatus according to Additional Remark 4, wherein the incident angle adjusting system includes a convex lens, and the convex lens is movable along an optical axis direction of the convex lens.

According to the configuration of Additional Remark 7, moving the convex lens in the optical axis direction allows the angle of incidence of the second light with respect to the wavelength converter to be readily adjusted.

Additional Remark 8

The light source apparatus according to Additional Remark 7, wherein the convex lens is an anamorphic lens.

According to the configuration of Additional Remark 8, since the reduction factor of the second light in a specific direction can be made smaller than the reduction factor of the second light in another direction, loss of the second light at the light incident position on the light guide can be reduced, so that the efficiency at which the second light is used can be increased.

Additional Remark 9

The light source apparatus according to Additional Remark 6 or 8, wherein a focal length of the anamorphic lens in a major axis direction of a cross-sectional shape of the second light perpendicular to an optical axis is shorter than a focal length of the anamorphic lens in a minor axis direction of the cross-sectional shape.

According to the configuration of Additional Remark 9, since the reduction factor of the second light in the major axis direction of the cross-sectional shape can be made smaller than the reduction factor of the second light in the minor axis direction thereof, loss of the second light at the light incident position on the light guide can be effectively reduced.

Additional Remark 10

The light source apparatus according to any one of Additional Remarks 1 to 3, wherein the wavelength converter includes a first wavelength converter configured to convert the first light and the second light into the third light and a second wavelength converter configured to convert the first light and the second light into the third light, the light guide is disposed between the first wavelength converter and the second wavelength converter, and the first light source includes a third light source configured to cause the first light to enter the first wavelength converter and a fourth light source configured to cause the first light to enter the second wavelength converter.

According to the configuration of Additional Remark 10, the amount of the first light that enters the wavelength converter can be increased, so that the amount of the third light can be increased.

Additional Remark 11

The light source apparatus according to Additional Remark 10, wherein the incident angle adjusting system includes a first concave lens and a second concave lens with curvature of a lens surface of the first concave lens being different from the curvature of a lens surface of the second concave lens, and the first concave lens and the second concave lens are interchangeable with each other.

According to the configuration of Additional Remark 11, exchanging the first concave lens and the second concave lens with each other allows the angle of incidence of the second light with respect to the wavelength converter to be readily adjusted.

Additional Remark 12

The light source apparatus according to Additional Remark 10, wherein the incident angle adjusting system includes a concave lens, and the concave lens is movable along an optical axis direction of the concave lens.

According to the configuration of Additional Remark 12, moving the concave lens in the optical axis direction allows the angle of incidence of the second light with respect to the wavelength converter to be readily adjusted.

Additional Remark 13

The light source apparatus according to any one of Additional Remarks 1 to 12, wherein the first light is blue light, the second light is blue light, and the third light is yellow light containing a green light component and a red light component.

According to the configuration of Additional Remark 13, a light source apparatus capable of efficiently outputting white light can be realized.

Additional Remark 14

The light source apparatus according to any one of Additional Remarks 1 to 13, wherein the second light source includes a laser diode configured to output the second light.

According to the configuration of Additional Remark 14, configuring the light emitter with a laser diode, which is a point light source, allows a parallelizing system to produce parallelized light.

Additional Remark 15

The light source apparatus according to Additional Remark 14, further including a light diffuser disposed in a region on the first surface side of the light guide and configured to diffuse the second light.

According to the configuration of Additional Remark 15, even when a laser diode is used, the light orientation distribution of the second light can be widened to be close to the light orientation distribution of the third light, so that color unevenness in a downstream optical system can be reduced.

Additional Remark 16

The light source apparatus according to Additional Remark 14 or 15, wherein the first light source includes a light emitting diode configured to emit the first light.

According to the configuration of Additional Remark 16, the cost of the light source apparatus can be reduced, and the light emission efficiency can be improved.

Additional Remark 17

The light source apparatus according to any one of Additional Remarks 1 to 16, wherein the second light source includes a first light emitter configured to emit the second light and a second light emitter configured to emit the second light, and the light source apparatus further includes a luminous flux width reducing system configured to reduce a width of a luminous flux containing the second light emitted from the first light emitter and the second light emitted from the second light emitter.

According to the configuration of Additional Remark 17, the luminous flux width reducing system can reduce the luminous flux width of the second light to increase the amount of the second light while suppressing loss of the second light, so that the amount of the combined light, which is the combination of the second light and the third light, can be increased as a whole.

Additional Remark 18

A projector including:

the light source apparatus according to any one of Additional Remarks 1 to 17;

a light modulator configured to modulate light output from the light source apparatus; and a projection optical apparatus configured to project the light modulated by the light modulator.

According to the configuration of Additional Remark 18, since the light source apparatus outputs the combined light, which is the combination of the second light and the third light, only one light source apparatus is required, so that a projector having a highly efficient and simple configuration can be realized.

What is claimed is:

1. A light source apparatus comprising:

a first light source configured to output first light having a first wavelength band;

a second light source configured to output second light having a second wavelength band;

a wavelength converter configured to convert the first light and the second light into third light having a third wavelength band different from the first wavelength band and the second wavelength band;

a first optical layer disposed between the first light source and the wavelength converter and configured to transmit the first light and reflect the third light;

a light guide disposed between the first optical layer and the wavelength converter and configured to guide each of the first light, the second light, and the third light;

an incident angle adjusting system disposed between the second light source and the light guide and configured to adjust an angle of incidence of the second light with respect to the wavelength converter; and a second optical layer disposed between the incident angle adjusting system and the light guide and configured to transmit the second light and reflect the third light, wherein the wavelength converter has a first surface and a second surface that face opposite sides, and a third surface that intersects with the first surface and the second surface, the first light output from the first light source enters the wavelength converter via the first optical layer and the light guide and via the third surface, the third light, into which the first light and the second light are converted by the wavelength converter, travels through the light guide, and exits out of a region on the first surface side of the light guide, the second light output from the second light source enters the incident angle adjusting system, which adjusts the angle of incidence of the second light, and the resultant second light enters a region on the second surface side of the light guide via the second optical layer, and part of the second light entering the light guide enters the wavelength converter via the third surface and is converted into the third light by the wavelength converter, and another part of the second light entering the light guide exits out of a region on the first surface side of the light guide.

2. The light source apparatus according to claim 1, wherein the light guide includes a light transmissive member configured to transmit the first light, the second light, and the third light, and the second light and the third light exit via an end surface of the light transmissive member that is a surface facing the first surface.

3. The light source apparatus according to claim 1, wherein the light guide includes an air layer, and the second light and the third light exit out of a region on the first surface side of the air layer.

4. The light source apparatus according to claim 1, wherein the third surface of the wavelength converter has a first side surface and a second side surface that face opposite sides, the light guide includes a first light guide disposed so as to face the first side surface and a second light guide disposed so as to face the second side surface, and the first light source includes a third light source configured to cause the first light to enter the wavelength converter via the first light guide, and a fourth light source configured to cause the first light to enter the wavelength converter via the second light guide.

5. The light source apparatus according to claim 4, wherein the incident angle adjusting system includes a first convex lens and a second convex lens having focal lengths different from each other, and the first convex lens and the second convex lens are interchangeable with each other.

6. The light source apparatus according to claim 5, wherein the first convex lens and the second convex lens are each anamorphic lenses.

7. The light source apparatus according to claim 4, wherein the incident angle adjusting system includes a convex lens, and the convex lens is movable along an optical axis direction of the convex lens.

8. The light source apparatus according to claim 7, wherein the convex lens is an anamorphic lens.

9. The light source apparatus according to claim 6, wherein a focal length of the anamorphic lens in a major axis direction of a cross-sectional shape of the second light perpendicular to an optical axis is shorter than a focal length of the anamorphic lens in a minor axis direction of the cross-sectional shape.

10. The light source apparatus according to claim 1, wherein the wavelength converter includes a first wavelength converter configured to convert the first light and the second light into the third light and a second wavelength converter configured to convert the first light and the second light into the third light, the light guide is disposed between the first wavelength converter and the second wavelength converter, and the first light source includes a third light source configured to cause the first light to enter the first wavelength converter and a fourth light source configured to cause the first light to enter the second wavelength converter.

11. The light source apparatus according to claim 10, wherein the incident angle adjusting system includes a first concave lens and a second concave lens with curvature of a lens surface of the first concave lens being different from the curvature of a lens surface of the second concave lens, and the first concave lens and the second concave lens are interchangeable with each other.

12. The light source apparatus according to claim 10, wherein the incident angle adjusting system includes a concave lens, and the concave lens is movable along an optical axis direction of the concave lens.

13. The light source apparatus according to claim 1, wherein the first light is blue light, the second light is blue light, and the third light is yellow light containing a green light component and a red light component.

14. The light source apparatus according to claim 1, wherein the second light source includes a laser diode configured to output the second light.

15. The light source apparatus according to claim 14, further comprising a light diffuser disposed in a region on the first surface side of the light guide and configured to diffuse the second light.

16. The light source apparatus according to claim 14, wherein the first light source includes a light emitting diode configured to emit the first light.

17. The light source apparatus according to claim 1, wherein the second light source includes a first light emitter configured to emit the second light and a second light emitter configured to emit the second light, and the light source apparatus further comprises a luminous flux width reducing system configured to reduce a width of a luminous flux containing the second light emitted from the first light emitter and the second light emitted from the second light emitter.

18. A projector comprising:

the light source apparatus according to claim 1;

a light modulator configured to modulate light output from the light source apparatus; and a projection optical apparatus configured to project the light modulated by the light modulator.

* * * * *